(12) United States Patent
Segert

(10) Patent No.: US 10,922,842 B1
(45) Date of Patent: *Feb. 16, 2021

(54) SYSTEM AND METHOD FOR MACHINE VISION FEATURE DETECTION AND IMAGING OVERLAY

(71) Applicant: JX Imaging ARTS, LLC, Columbia, MO (US)

(72) Inventor: Jan Segert, Columbia, MO (US)

(73) Assignee: JX Imaging Arts, LLC, Columbia, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,474

(22) Filed: May 24, 2019

Related U.S. Application Data

(63) Continuation of application No. 15/432,909, filed on Feb. 14, 2017, now Pat. No. 10,319,108.

(51) Int. Cl.
*G06T 7/77* (2017.01)
*G06T 7/73* (2017.01)

(52) U.S. Cl.
CPC .............. *G06T 7/77* (2017.01); *G06T 7/75* (2017.01); *G06T 2207/10016* (2013.01); *G06T 2207/10024* (2013.01); *G06T 2207/10116* (2013.01); *G06T 2207/30052* (2013.01); *G06T 2207/30221* (2013.01); *G06T 2207/30224* (2013.01)

(58) Field of Classification Search
CPC .................................................... G06T 7/70
See application file for complete search history.

(56) References Cited

U.S. PATENT DOCUMENTS

| | | | |
|---|---|---|---|
| 9,111,180 B2 * | 8/2015 | Rappaport | A61B 5/107 |
| 2008/0056552 A1 * | 3/2008 | Muller | A61B 5/4528 |
| | | | 382/132 |
| 2008/0312663 A1 * | 12/2008 | Haimerl | G06T 7/0012 |
| | | | 606/130 |
| 2013/0072821 A1 * | 3/2013 | Odermatt | A61B 34/25 |
| | | | 600/595 |
| 2014/0378828 A1 * | 12/2014 | Penenberg | A61F 2/34 |
| | | | 600/424 |
| 2019/0201155 A1 * | 7/2019 | Gupta | A61B 5/055 |

* cited by examiner

*Primary Examiner* — Ping Y Hsieh
*Assistant Examiner* — Jose M Torres
(74) *Attorney, Agent, or Firm* — Brian Billett

(57) ABSTRACT

Methods and systems for detecting orientation parameters of spherical objects by image processing are utilized to generate geometric models of the objects and displaying overlay graphics of the models in combination with original images which contain the objects. This process is utilized for detecting the orientation parameters of an artificial hip joint from an x-ray image and generating a geometric model of portions of the joint to be displayed as overlay graphics in combination with the original x-ray image. A disclosed embodiment detects the rotation of a basketball from video frame images and generates geometric models of the basketball including surface markings and rotational parameters which may be displayed as overlay graphics in combination with the original video image frames.

21 Claims, 37 Drawing Sheets

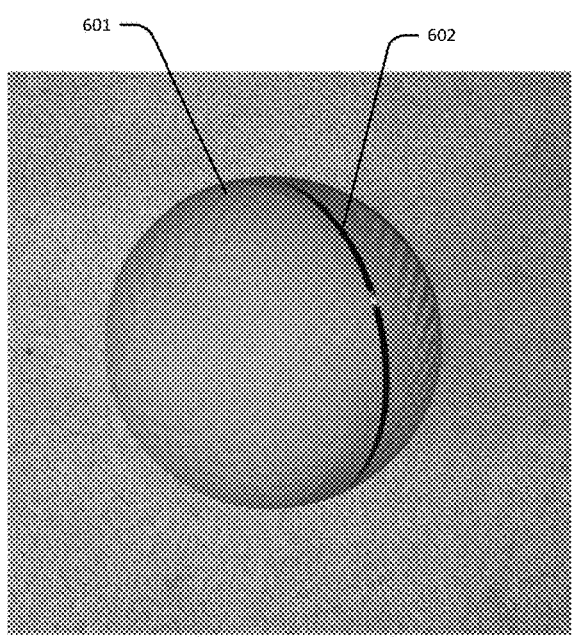
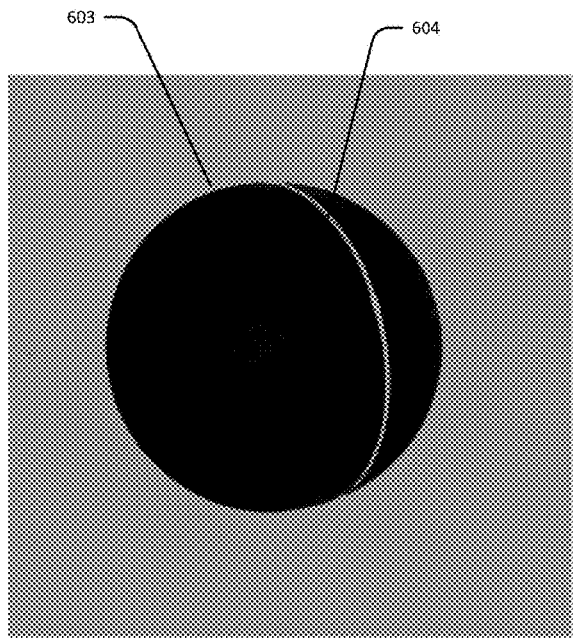
Fig. 6A
Fig. 6B
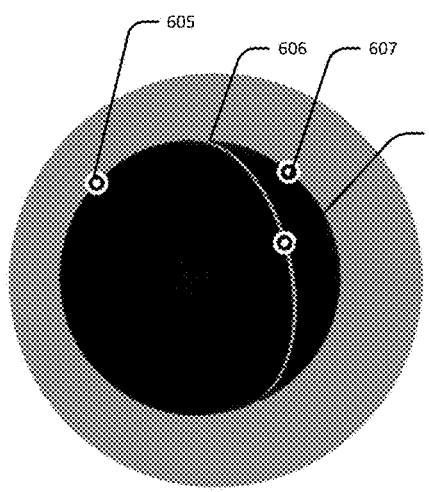
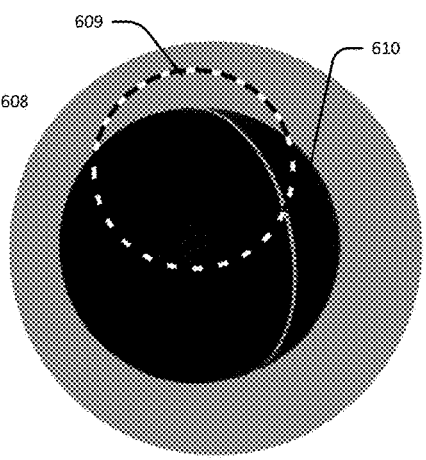
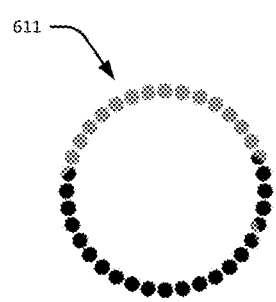
Fig. 6C
Fig. 6D
Fig. 6E

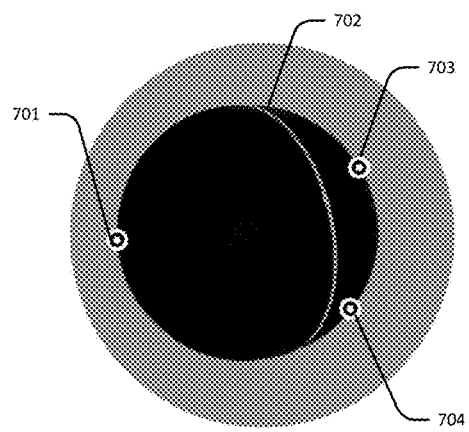 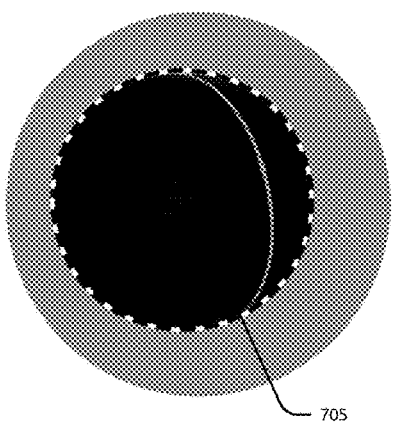 
Fig. 7A  Fig. 7B  Fig. 7C
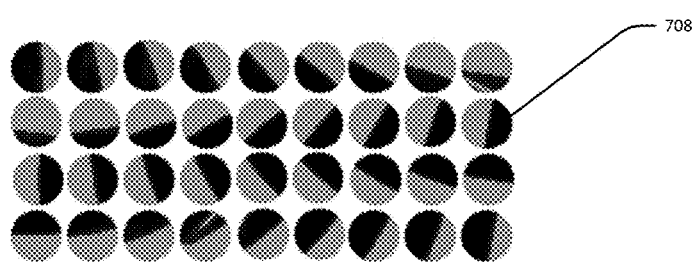
Fig. 7D

SYSTEM AND METHOD FOR MACHINE VISION FEATURE DETECTION AND IMAGING OVERLAY

RELATED APPLICATIONS

This application claims the benefit of and is a continuation of non-provisional U.S. patent application Ser. No. 15/432,909, filed on Feb. 14, 2019, which is incorporated herein in its entirety.

FIELD

This field of this disclosure relates generally to image processing and machine vision.

BACKGROUND

Imaging is one methodology for sensing objects in a scene by capturing reflected or transmitted light. Stereoscopic imaging is a common methodology in nature and in machine vision for sensing object position and orientation in 3 dimensions. Stereo imaging has many limitations, particularly for transmitted light imaging, such as x-ray imaging. Measuring object orientation information from a single image generally depends on the capability to model the object imaged, including any relevant features or characteristics of the object which can be captured by imaging. A variety of image processing and machine vision techniques have been proposed to address specific orientation measurement problems, with varying degrees of success.

A longstanding problem in clinical orthopedics is establishing appropriate rotational alignment of an artificial hip socket, or acetabular component, in a patient during hip replacement surgery. Various systems and methods have been developed which utilize image processing to assist in this procedure, with limited success. Several proposed systems rely almost completely on the human identification of landmarks in the image and essentially use the image processing as simply tracing paper on top of an X-ray image. Accuracy, reliability, and repeatability of such methods are inherently fallible and adoption has been limited.

A longstanding problem in sports is the reliability of officiating of close calls during play. One such problem, for the sport of basketball, is determining whether the ball had or had not been touched by a player at a particular point in time.

BRIEF DESCRIPTION OF THE DRAWINGS

FIGS. 6A-B show two exemplar images of a ball with an evident or visible great circle on the ball before and after color and contrast processing.

FIGS. 6C-F show images of the ball from FIG. 6A during three stages of great circle measurement and a magnified detail of the random sample consensus scoring disks from the third stage.

FIGS. 7A-D show images of the ball from FIG. 6A during three stages of great circle measurement a magnified detail of the random sample consensus scoring disks from the third stage.

DESCRIPTION

Figure 1:
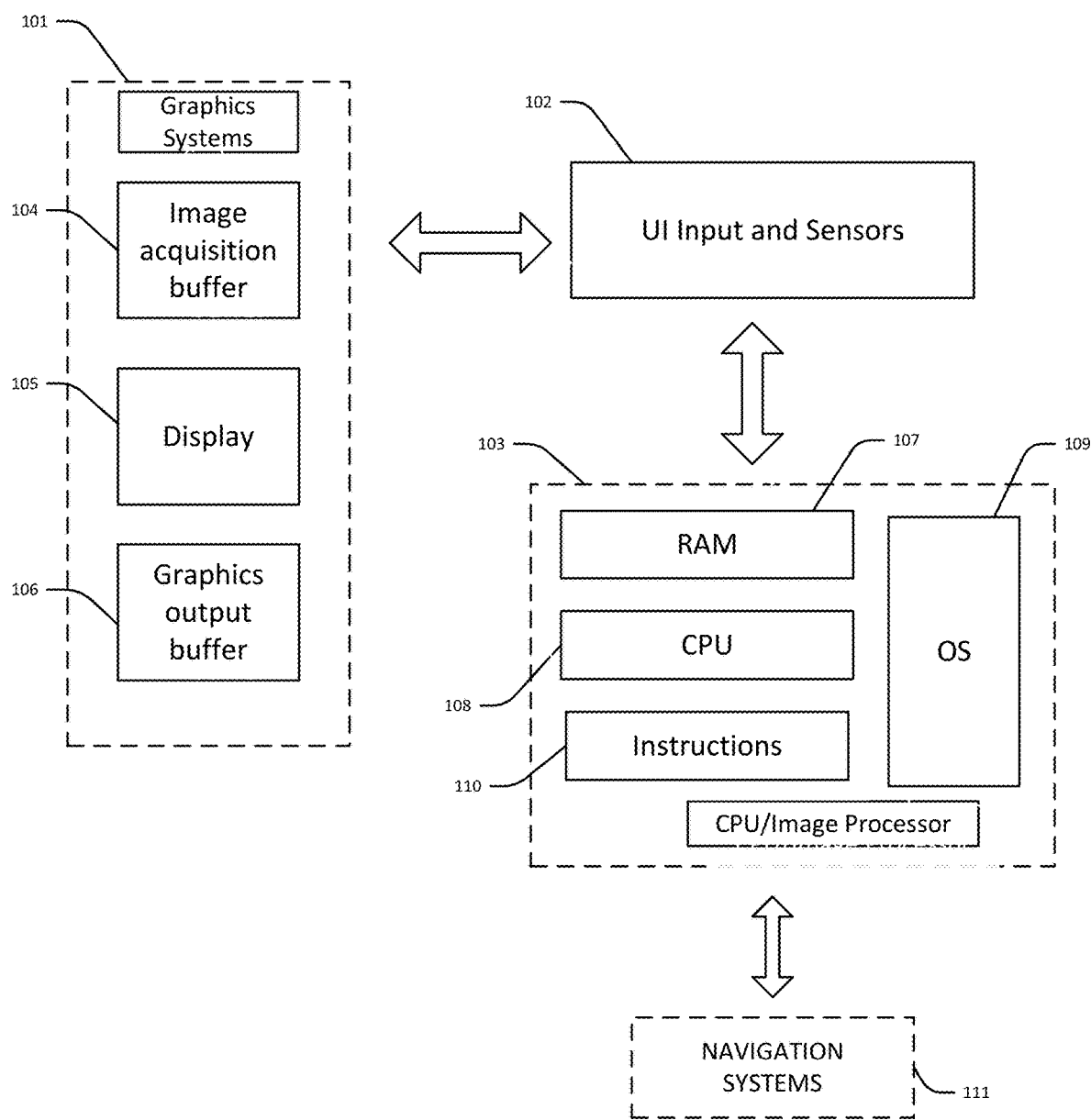
FIG. 1 shows a component diagram of a disclosed machine vision system.

Unexpectedly, the two problems mentioned above share common geometric aspects which as discussed here, may utilize different embodiments of the disclosed methodology to provide a machine vision approach to solving both.

Disclosed are a method and system to quickly and precisely measure object orientation information for a spherical or hemispherical object by machine vision analysis of imaged great circles in a reflective planar image, such as a photograph, or transmissive planar image such as an x-ray. Also disclosed are systems and methodologies for implementing this machine vision methodology to measuring hemisphere orientation of the hemispherical acetabular cup component of an artificial hip from an x-ray image, measuring basketball rotation from a series of captured video frame images, and measuring hemisphere orientation of a planetary body for spacecraft navigation. Note that as used here, orientation is distinguishable from pose which incorporates both position and orientation.

As an introduction to disclosed systems and methods, note the following examples of great circles which are visible or otherwise marked on a spherical object. The photo of the rubber ball shown in the first frame of FIG. 6 exhibits the image of a great circle marked in black on the ball. Each of the two photos of a basketball shown in FIG. 35 exhibits highlighted images of two great circles marked in black on the ball, as well as images of additional black markings on the ball. The photo of the planetary body Ceres shown in FIG. 11 exhibits a great circle image as the boundary between the unlit and lit hemispheres.

As definitions of certain terms in this disclosure the following is provided. The planar orientation of a 2-dimensional plane embedded in 3-dimensional space is represented by a nonzero planar orientation vector $u=(u_1, u_2, u_3)$ pointing away from the plane in a perpendicular/normal direction. The planar orientation vector $u'$ represents the same planar orientation as $u$ if and only if $u'=\lambda u$ for some nonzero real number $\lambda$. A great circle on a sphere is defined to be the intersection of the sphere with a 2-dimensional plane passing through the sphere's centerpoint. The great circle orientation of a great circle is defined to be the planar orientation of its defining plane. Note that a great circle orientation may be specified by a point on the real projective plane, so it is specified by two real number orientation parameters locally. A hemisphere is comprised of the points on a sphere that are on the same side of a plane passing through the sphere's centerpoint. The hemisphere orientation of a hemisphere is represented by a nonzero hemisphere orientation vector $v=(v_1, v_2, v_3)$ pointing away from the plane in a perpendicular/normal direction in the opposite direction from the points of the hemisphere. The hemisphere orientation vector $v'$ represents the same hemisphere orientation as $v$ if and only if $v'=\mu u$ for some real number that is required to be positive, no merely nonzero. Note that a hemisphere orientation may be specified by a point on the two-dimensional sphere, so it is specified by two real number orientation parameters locally.

Imaging, such as photography or x-ray, of a physical object may be modeled by orthogonal projection of 3-dimensional space to an embedded 2-dimensional image plane. Choosing 3-dimensional Cartesian coordinates such that every point $x=(x_1, x_2, x_3)$ on the image plane has $x_3=0$, orthogonal projection to the image plane takes the spatial point $x=(x_1, x_2, x_3)$ to the point $\underline{x}=(x_1, x_2)$ on the image plane. The physical objects of interest in this disclosure are spheres or segments of spheres, which are assumed to lie below the image plane in the sense that every point $x=(x_1, x_2, x_3)$ on the surface of the sphere has $x_3<0$. In this disclosure the radius of the spherical object is denoted by $p$ and the centerpoint by $c=(c_1, c_2, c_3)$, and the plane passing through the sphere's centerpoint with the same planar orientation as the image plane is called the reference plane. The intersection of the sphere with the reference plane is a great circle that is called the reference circle. A great circle is nondegenerate if it is not the reference circle. A great circle is assumed to be nondegenerate unless it is explicitly stated to be the reference circle. The upper hemisphere consists of points on the sphere that lie between the reference plane and the image plane. The intersection of a great circle with the upper hemisphere is called an upper semicircle. The lower hemisphere consists of points on the sphere that lie neither on the upper hemisphere nor on the reference circle. The intersection of a great circle with the lower hemisphere is called a lower semicircle.

For spherical or hemispherical objects, the orientation methodologies disclosed utilize a marked great circle on the object or inherent to the object. Measurement performed on a planar image of the object is utilized for measurement of great circle orientation or hemisphere orientation. The degenerate case where a marked great circle is the reference circle is not considered. As detailed below, the projection of an upper or lower semicircle to the image plane is a semiellipse.

On images of a spherical object produced with a reflective imaging method, such as photography, the reference circle and the upper hemisphere of the object are visible. The reference circle appears on the image as a circle, and the upper hemisphere as the disc consisting of the points inside this circle. The upper semicircle of any marked or otherwise visible great circle on the sphere appears on the image as a semiellipse. The lower hemisphere is not visible with reflective imaging, because it is obscured by the upper hemisphere. Therefore the lower semicircle of a marked great circle is also not visible with reflective imaging. The known relationship between the orientation of a great circle on a spherical object and the shape of the corresponding imaged semiellipse is utilized in the disclosed measurement methods.

Figure 36A:
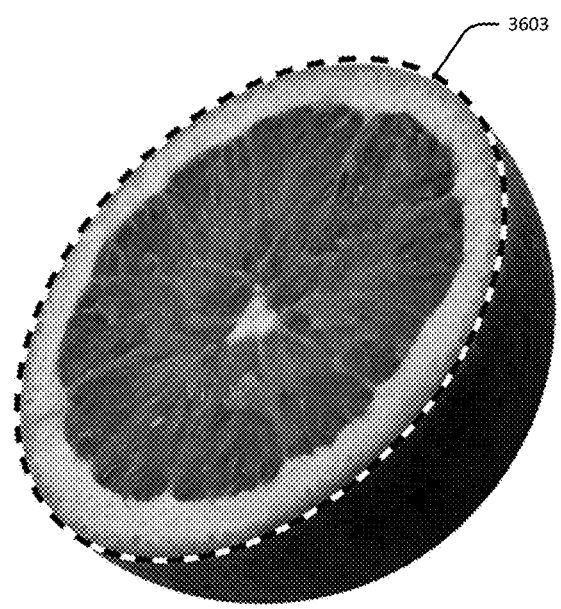
FIGS. 36A-B show reflective and transmissive images of a hemispherical segment of an orange with the visible portions of the great circle highlighted.
Figure 36B:
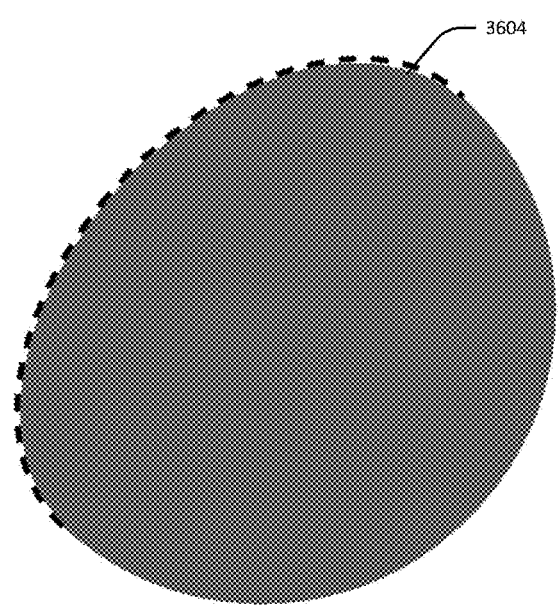

On a hemispherical object, the boundary between the hemispherical part and planar disc portions of the surface is an inherent great circle. With a reflective imaging method, such as photography, this great circle may be visible on the image in its entirety. An exemplar photographic image of a hemispherical segment of an orange is shown in FIG. 36A, with the elliptical image 3603 of the entire great circle highlighted. But with a transmissive imaging method, such as x-ray, only the silhouette or outline of the object may be visible. FIG. 36B shows as an exemplar of a transmissive image the silhouette of the hemispherical image in FIG. 36A. The visible image of the lower semicircle appears as the highlighted semiellipse 3604, but the image of the upper semicircle is not visible. The known relationship between the hemisphere orientation of a hemispherical object and the shape of the corresponding imaged semiellipse is utilized in the disclosed measurement methods. Utilizing a transmissive image, such as an x-ray, of a hemispherical object, it may not be possible to distinguish whether a semiellipse is the image of an upper or lower semicircle. Additional information may be necessary to distinguish between the two possible hemisphere orientations.

In this disclosure and as commonly used in image processing, a geometric figure is an image feature that is well-approximated by a model image that is specified by a small number/set/collection of geometric model parameters (real numbers). Image features that look like lines, circles, ellipses, and semiellipses are all examples of geometric figures. A line model is specified by two geometric model parameters, conventionally taken to be the slope and the y-intercept. A circle model is specified by three geometric model parameters, conventionally taken to be the radius and the two Cartesian coordinates of the circle's centerpoint. A measurement of a geometric figure is comprised of the numerical geometric model parameter values for a model image that is a good match to geometric figure in the original image. The accuracy of the measurement of course depends on the quality of the match.

In various embodiments measurement of a geometric figure typically starts with image preprocessing. Preprocessing typically begins with detection and processing of color and/or contrast. Preprocessing often includes detection/identification of edgepoints that lie on the boundaries of regions with specified color and/or intensity. Preprocessing then often proceeds to isolating a region of interest by cropping out of regions of the image that contain mainly irrelevant features. Relevant information from an appropriately preprocessed cropped image may be summarized as a list/set/image of characteristic points that meet specified criteria. The set of characteristic points is often the set of edgepoints on a preprocessed image. Alternately the set of characteristic points could be the points of a specified intensity and/or color. In various embodiments, the measurement of a preprocessed image uses one or more iterations of model generation and scoring, which consists of the two consecutive steps:

Model generation is creation of a model for the geometric figure. The model may be based on a set of characteristic points taken from the image, but it could just be randomly generated with no reference to the image.

Model scoring assigns to the model a numerical score, where a higher number means a better match to the geometric figure in the image. A standard scoring method is inlier ratio. A fixed number of small discs are distributed along the model image. An inlier is a characteristic point that is contained in one of these discs. The inlier ratio score is the number of discs that contain one or more inliers divided by the total number of discs. Examples of scoring are illustrated in the third frame of FIGS. 6-10. Inlier ratio scoring can be refined for higher precision by including a term depending on the distance from the centerpoint of the disc to the nearest inlier and/or a term depending on the number of inlier points contained in the disc. Precomputing a distance transform from the image/set/list of characteristic points greatly speeds up the inlier ratio scoring.

As used in this disclosure, a good model is a model with a high score. In various embodiments, after completion of the model generation and scoring iterations, the output is the best model, meaning the model with the highest numerical score attained. The measurement of the geometric shape is defined to be the set of numerical values of the geometric model parameters for the best model. Various embodiments are directed to produce a precise and accurate measurement of a geometric figure within prescribed limits on number of iterations and/or computing time. Achieving this requires efficient generation of models in the sense that good models comprise a significant fraction of the generated models.

Disclosed methods may include embodiments which include aspects of the measurement process which are assisted by a human operator and embodiments which are fully automated and involve no human input. The disclosed methods of the automated measurement process are fast and yield a precise and accurate measurement of orientation. Furthermore, disclosed methods are robust, in the sense that random errors or significant partial obscuring of the image do not significantly affect the time and accuracy of the orientation measurement. Two primary measurement methods are disclosed including a simple automated methodology and an alternative methodology which incorporates certain process changes demonstrating higher efficiency and robustness.

Also disclosed are various application-specific embodiments for measuring orientation information for planetary navigation, measuring basketball rotation, and measuring artificial hip socket orientation information. We will consider several devices whose operation is based on the measurement of great circle orientation or hemisphere orientation. These measurements are useful and practical only when certain accuracy and speed criteria are met. The disclosed embodiments have been show to meet such criteria. The disclosed embodiments are applicable to: planetary navigation using onboard digital processing; the measurement of basketball orientation and rotation from frames of video, allowing detection ball angular velocity changes resulting from a player touching the ball; the measurement of hip implant cup orientation parameters during surgery.

The disclosed methodologies use an iterative process for measuring orientation information from image analysis. First, various embodiments for the system components are described, and then an exemplar process is described. Then alternative detailed image analysis processes are described which may be utilized for the various embodiments disclosed.

In FIG. 1, a generalized component diagram for various embodiments is shown. Components for an implementation of the system generally include a user interface 102 for receiving user input, which in certain embodiments includes selecting a region of interest. If a user interface is implemented it typically includes a display of the processed image and the orientation information measured by the processing. System components for sensors which are relevant to an embodiment are also included as a component of the system input/output or I/O. For various embodiments, these may include a digital camera, an accelerometer or other position or orientation sensors.

Also shown in FIG. 1 is the component or set of components comprising the graphics systems 101. Graphics systems may include in various embodiments an image acquisition buffer 104 which accepts digital image sensor input from the camera, a graphics output or video/display buffer 106 and an image display 105. Also shown in FIG. 1 are the processor components for performing the image processor implementation of the particular embodiment. The processor components include the instructions 110 for performing the image processing, the random access memory 107 which stores instructions and data, the central processing unit or CPU 108, and the operating system 109 which controls the image processing operations. In certain embodiments, a navigation system 111 is a component of the system, such as may be utilized by the spacecraft implementation detailed later.

Figure 2:
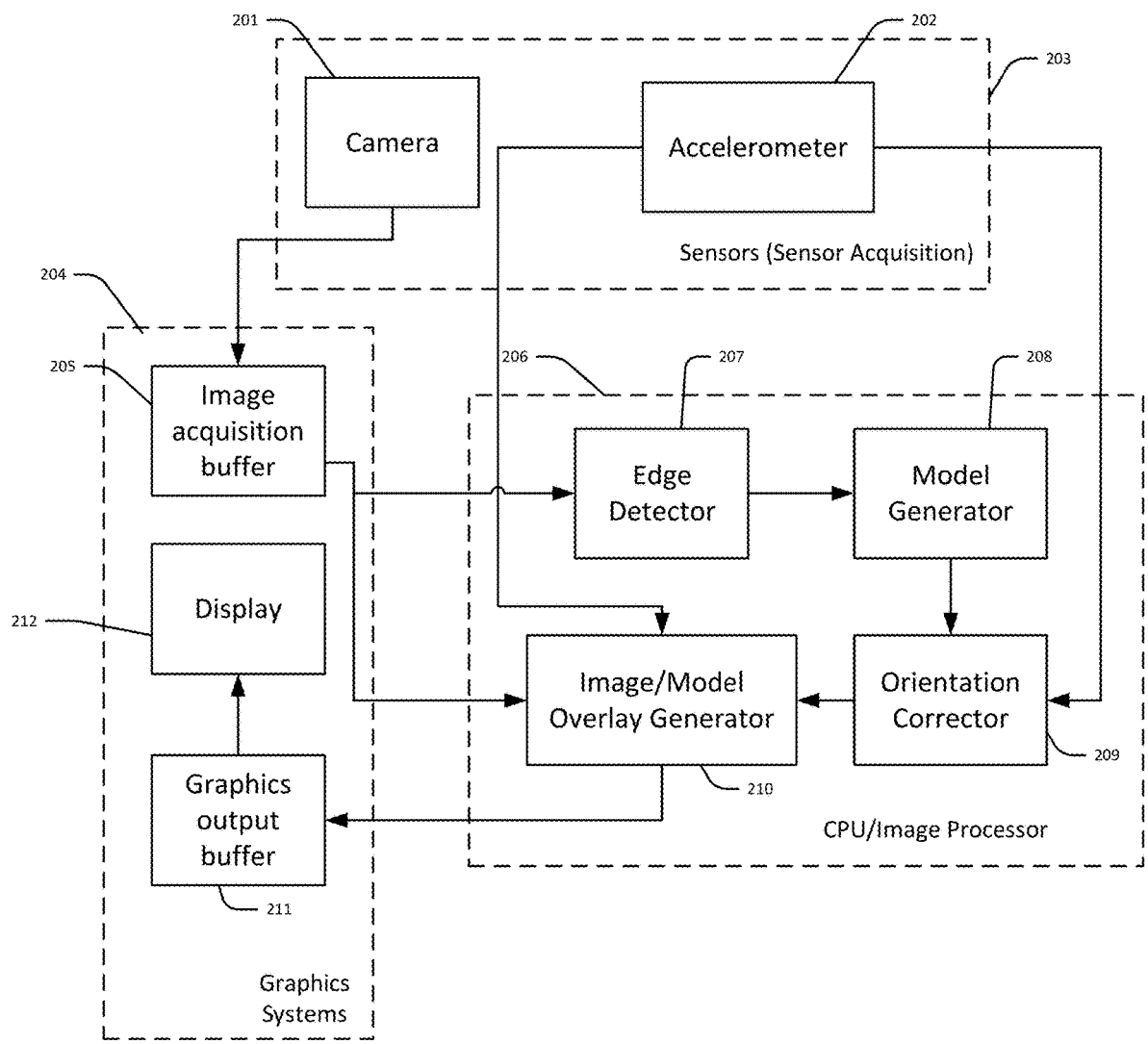
FIG. 2 shows a component and functional diagram for a disclosed machine vision system for measuring hemisphere orientation using medical x-ray images.

FIG. 2 shows a combined system component and data flow diagram for a typical embodiment such as may be used for measuring the hemisphere orientation of a hemispherical artificial hip component from an x-ray image. In various embodiments, the system sensors 203 include image capture device or camera 201 and an accelerometer 203 for measuring camera orientation information relative to gravitational vertical. The image capture device sends image data to the graphics system 204, in particular the image acquisition buffer 205, which buffers the image data for the CPU/image processing component 206. Image data passed to the CPU is processed by the edge detection component 207 which identifies the characteristic points used for the generation and scoring of models 208. The resulting geometric figure measurements may be corrected for camera orientation 209 according to the accelerometer 202. In certain embodiments the best model of the geometric figure is then overlaid onto the image along with the corrected measured orientation information for the imaged object. Lastly the combined image, overlay and measured orientation information are output to the graphics system output or display buffer 211 which is then directed to the user display 212.

Figure 3:
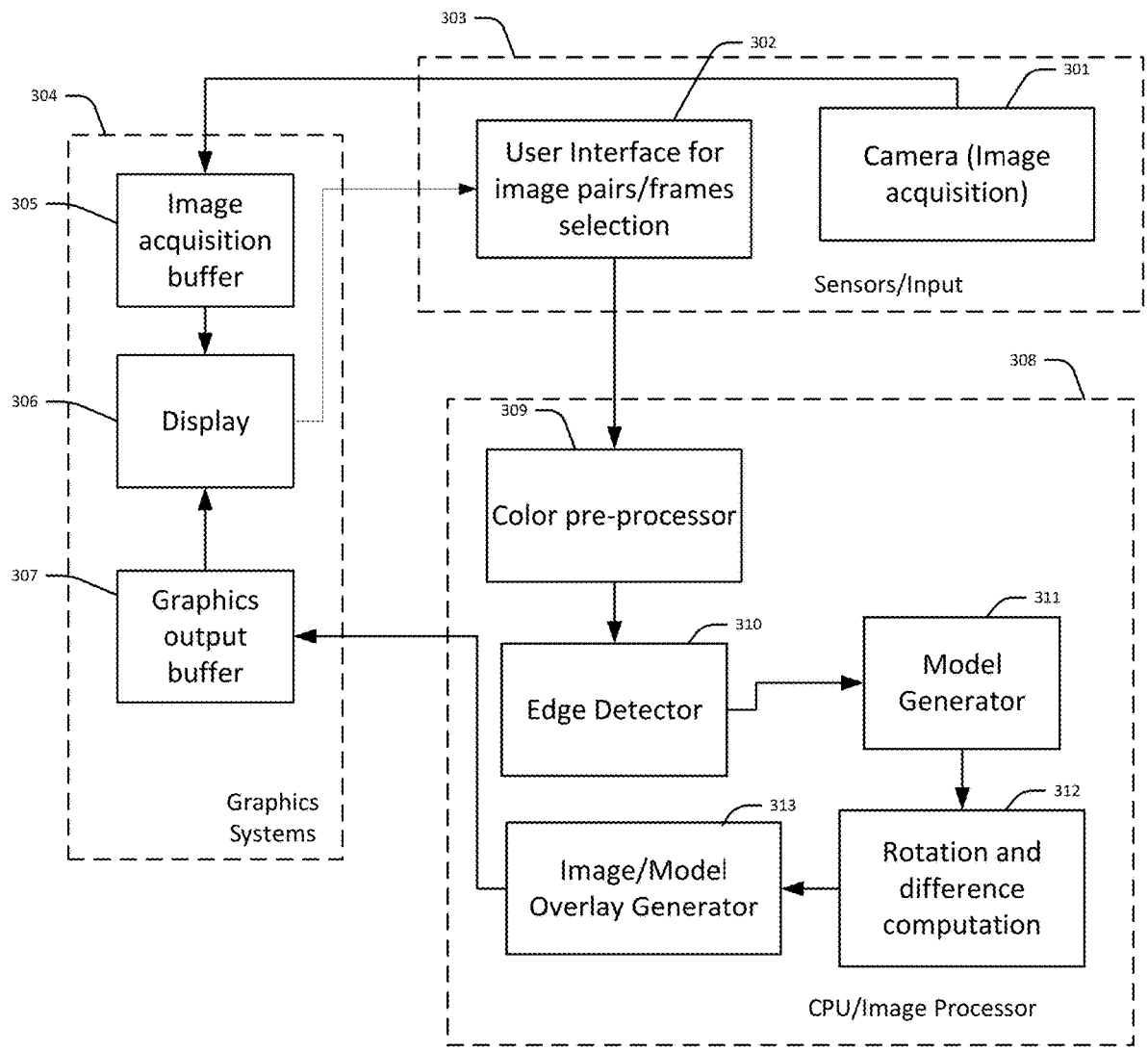
FIG. 3 shows a component and functional diagram for a disclosed machine vision system for measuring basketball rotation using video camera images.

FIG. 3 shows a component and data flow diagram for an embodiment which may be used to measure the rotation between successive video frame images of a ball with suitable markings, such as a basketball, by utilizing the disclosed methodology along with high-speed and high-definition video capture devices/cameras. In a typical implementation of these embodiments, system input is provided by the high-speed high-definition camera(s) 301 and user input 302 for the selection of a series of video frame images, which are used to measure rotation of an object, such as a basketball, using appropriate visible markings on the object. Selected series of image frames are sent to the image acquisition buffer 305, a part of the graphics system 304. Acquired series of frames are sent in various embodiments to the color preprocessor 309, a component of the image processing unit 308. The color preprocessor is used to enhance edge contrast for the next image processing step of edge detection 310. As is found in other embodiments, edge detection provides the characteristic points used to generate models 311 and measure orientation information. In variations of these embodiments, the measured orientation information for a series of successive image frames is used to determine object rotation between the frames 312. Which is then overlaid onto the image scene 313 wherein changes in the measured object rotation between subsequent image pairs is noted in the display overlay which is reflected back to the user display 306 through the output or display buffer 307.

Figure 4:
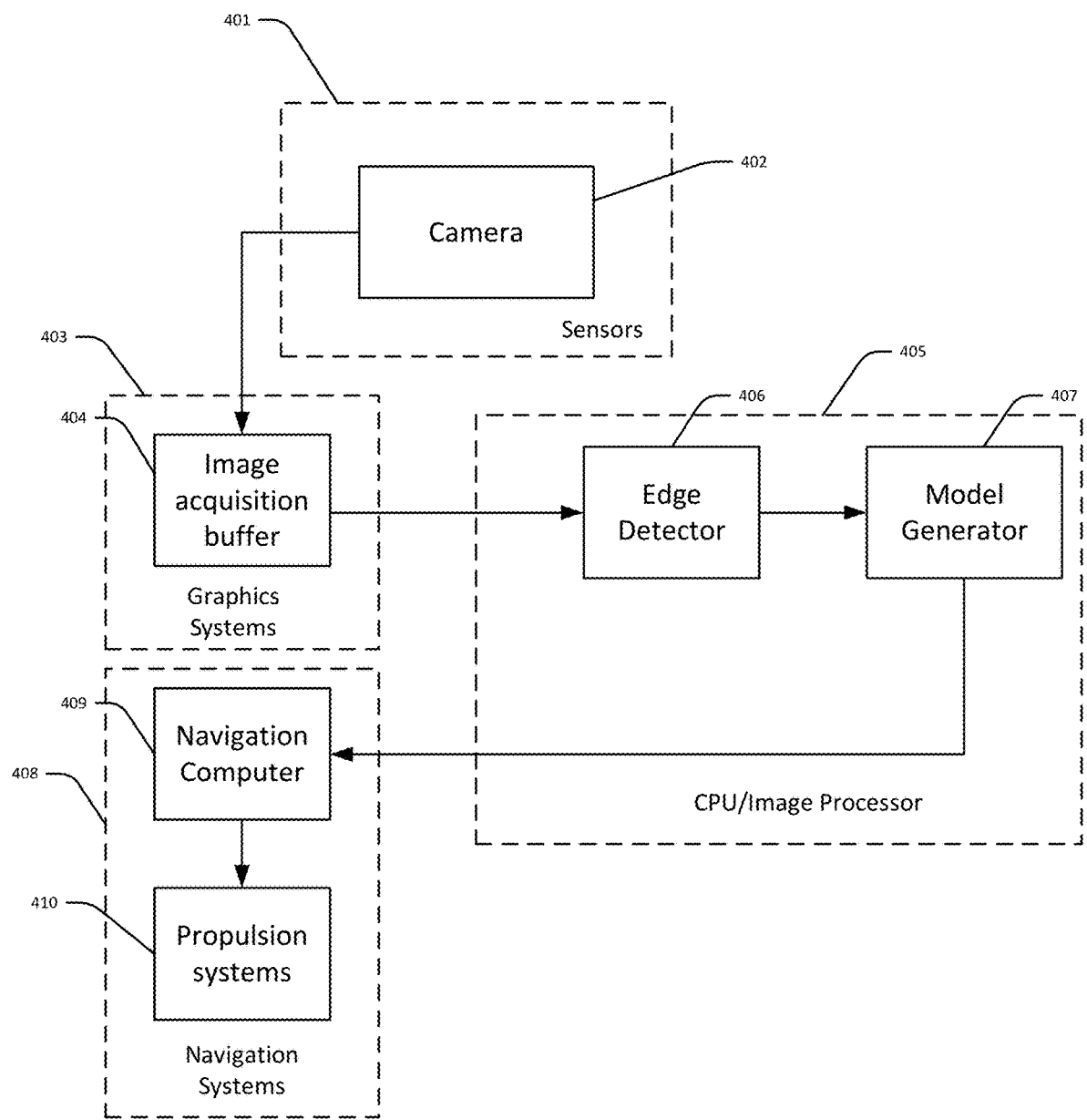
FIG. 4 shows a component and functional diagram for a disclosed machine vision system for spacecraft navigation using optical images of a planetary body.

FIG. 4 presents a component and data path diagram for a typical embodiment which utilizes the methodology of the present disclosure for use in planetary spacecraft navigation. In many respects this is the simplest embodiment as no user interface or display is required for the embodiment operation. System sensor input 401 is provided by the camera 402, which sends images to the graphics system 403 image acquisition buffer 404 before being passed to the image processing system 405 which performs the edge detection 406 and model generation as in other embodiments. The planetary navigation embodiment uses a single image of sunlight lit hemisphere on the planetary body to measure the direction of the sun relative to the pose of the spacecraft. Utilizing the derived position information determined by the navigation system 409, the spacecraft propulsion 410 is optimized for autonomous control.

Figure 5:
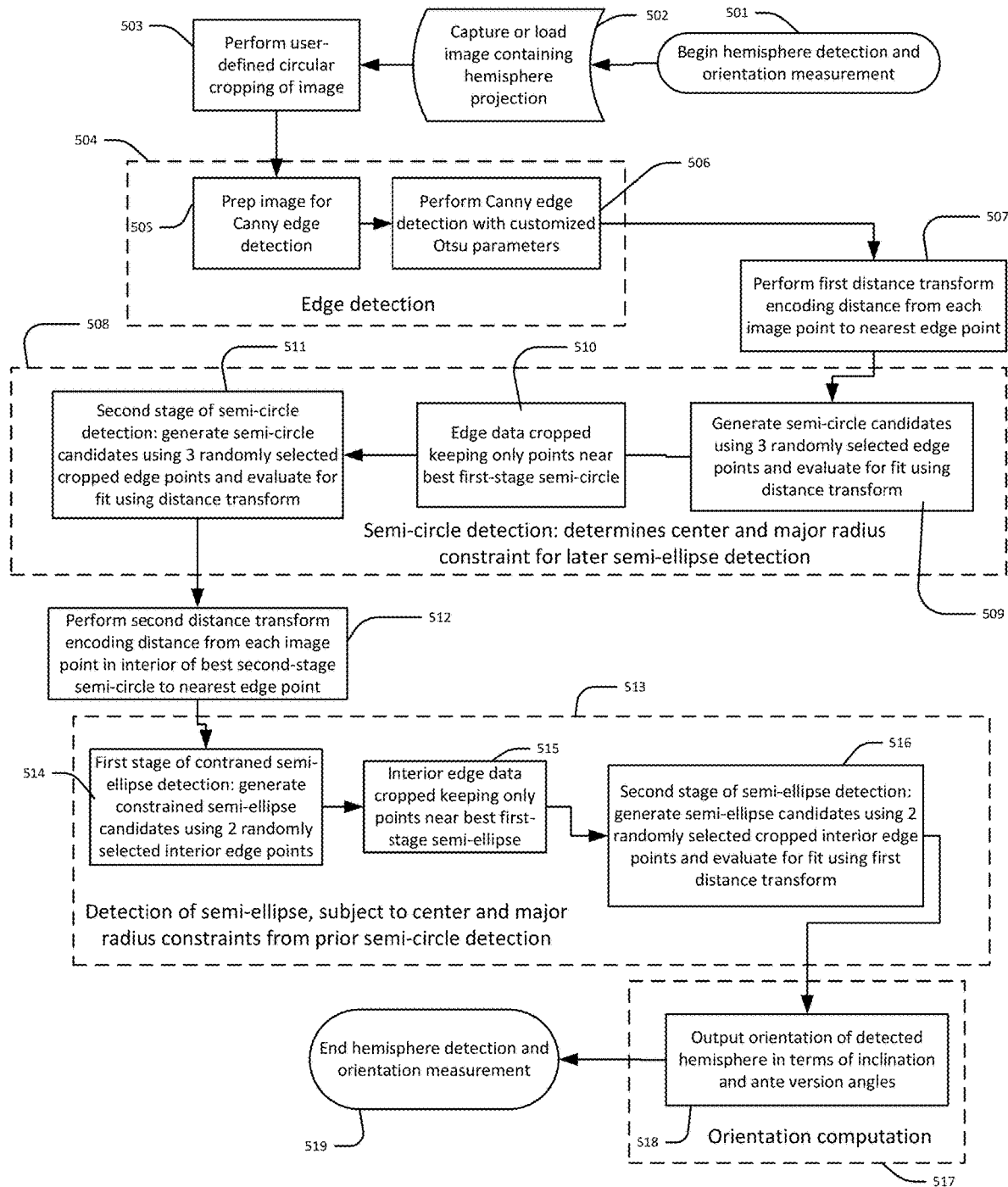
FIG. 5 shows a flow chart of a disclosed machine vision method for measuring hemisphere orientation using x-ray images.

FIG. 5 provides a more detailed algorithmic flow chart which diagrams a basic embodiment for measuring hemisphere orientation. Examples of the various stages will be detailed below. In this exemplar embodiment, once the process is initiated 501 the image to be analyzed or processed is captured or loaded by the system 502. In certain embodiments, a user interface is included wherein the user performs a selection of a circular region of the image which contains the hemispherical portion of the image 503. Other embodiments perform this function automatically. In various embodiments, the characteristic points are identified by Canny edge detection 504 using optimized Otsu parameters 506 following preparation/preprocessing of the image 505. A distance transform operation is performed on the wherein the distance from each image pixel location is to the closest characteristic point/edgepoint is computed 507. Following the computation of this distance transform, the two-stage iterative semicircle measurement phase of the process begins 508. For each iteration of the first stage 509, semicircle candidates are generated from random samples of 3 characteristic points, and scored by inlier ratio computed with the distance transform 507. After completion of the first stage, the set/image of characteristic points is cropped keeping only points near the best first-stage semicircle 510. For each iteration of the second stage of semicircle detection 511, semicircle candidates are generated from random samples of 3 characteristic points from the cropped set, and scored by inlier ratio computed with the distance transform. The process continues in various embodiments by creating a second distance transform which encodes the distances from each image pixel location to the nearest characteristic point that is inside the circle containing the best second-stage semicircle. The next phase 513 is a two-stage iterative semiellipse measurement process, subject to the centerpoint and major radius constraints from the prior semicircle measurement. For each iteration of the first stage 514, constrained semiellipse candidates are generated from random samples of 2 characteristic points, and scored by inlier ratio computed with the second distance transform 512. After completion of the first stage, the set/image of characteristic points is cropped keeping only points near the best first-stage constrained semiellipse 515. For each iteration of the second stage of constrained semiellipse detection 511, constrained semicircle candidates are generated from random samples of 2 characteristic points from the cropped set, and scored by inlier ratio this time computed with the first distance transform 507 which includes information points on the measured semicircle. Finally, hemisphere orientation is computed 517 and communicated terms of the inclination and anteversion angle orientation parameters 518 for output, completing the process cycle 519.

A basic embodiment methodology for automated model generation is based on selecting random samples of distinct characteristic points from the image. A process of measuring a geometric image by generating models this way and scoring them by inlier count (possibly refined) is known as RANSAC (RAndom SAmple Consensus). The number of characteristic points in a sample is chosen so that there is at most one model that contains all the sample points. For example, a line model requires a sample of two points, because there is exactly one line passing through two distinct points. A circle model requires a sample of three points, because there is at most one circle that contains three distinct points (the points could lie on a line instead of a circle). An ellipse model requires a sample of five points, because there is at most one ellipse that contains five distinct points (the points could for example lie on a hyperbola instead of an ellipse). A semiellipse model also requires a sample of five points, because there is at most one semiellipse that contains five distinct points. But not all characteristic points belong to the geometric figure, so a sample of characteristic points may contain some or all points that are not on the figure, generating a bad model. For example, suppose that ⅓ of the characteristic points lie on a circle, and ⅔ are noise. Then a random sample of three characteristic points has a probability of 1/27 of generating a good model. For comparison, suppose that ⅓ of the characteristic points lie on a semiellipse, and ⅔ are noise. Then a random sample of five characteristic points has a probability of 1/243 of generating a good model. Generation of semiellipse models is therefore less efficient than generation of circle models.

Image distortion can further degrade efficiency of model generation. Preprocessing can contribute to distortion of points on the geometric figure. Small distortions of the sample points may be magnified to larger errors in the geometric model parameters, reducing the efficiency of model generation. This effect is particularly pronounced when some of the sample points are close together. In various embodiments, when a sample requires many points, it may be difficult or impossible to generate samples where all points are well separated. This difficulty is further exacerbated in applications where the image of the geometric figure is partially obscured.

FIGS. 6-10 depict a simple demonstrative embodiment. In this basic embodiment a ball has one visible marked great circle, which appears as a semiellipse on the image. The semiellipse is inside the disc bounded by the circular image of the reference circle. Cropping to a slightly smaller concentric disc can significantly increase the efficiency of semiellipse measurement by removing some of the characteristic points that do not lie on the semiellipse. The circle measurement required for this cropping can be done relatively efficiently. In FIG. 6A the simple example image of a ball 601 is shown with its marked great circle 602 visible. Although not discernible from the monochrome figure, the image is of an orange ball. In FIG. 6B the image is shown after color and contrast preprocessing to convert the orange regions to black, enhancing the contrast between those regions of the ball 603 and the non-orange regions consisting of the background and the marked great circle 604. Automated machine measurement of great circle orientation is conveniently implemented by the following four consecutive image analysis steps:

Initial Circle Measurement.

Figure 6F:
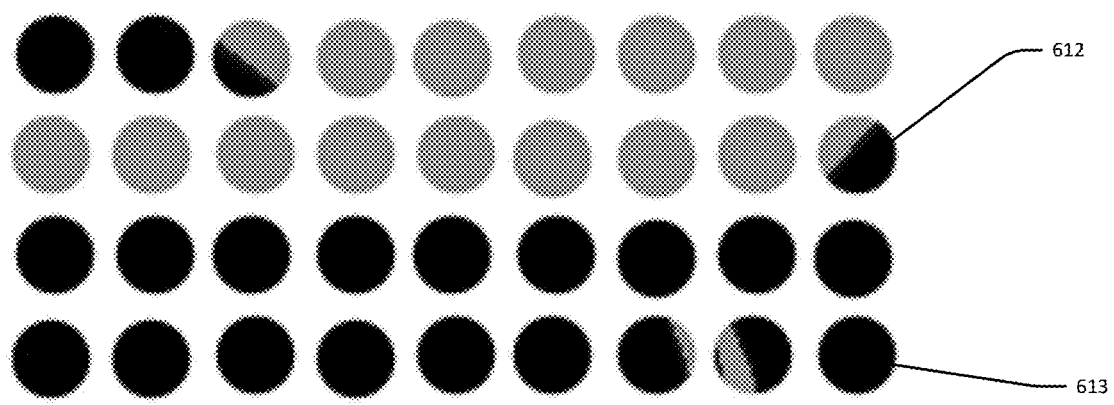

(Illustrated in FIGS. 6 and 7) In various embodiments the disclosed methodology performs appropriate preprocessing of contrast, color, and/or edge detection (FIGS. 6A and 6B). In FIGS. 6 and 7 the characteristic points are the edgepoints on the boundary of the black regions of the preprocessed image shown in FIG. 6B. The steps in FIGS. 6C-6E are repeated until the best circle is a good model of the image circle with high probability. In FIG. 6C, a random sample of 3 characteristic points 605 607 608 on the edge of the black region of the ball image 606 is chosen by the disclosed methodology. FIG. 6D shows the circle defined by this chosen sample. FIG. 6E is the scoring determination for the circle defined by this chosen sample. Scoring is performed by counting the number of small circular disks that contain a characteristic point. In this example, 4 of 36 small disks contain a characteristic point for a score of 4/36 or 0.111. An array of the individual disks from this example are shown magnified in FIG. 6F including a disk containing a characteristic point (edgepoint) 612 and a disk not containing a characteristic point (edgepoint) 613. In FIG. 7A, a different random sample of 3 characteristic points 701 703 704 for the black region of the same preprocessed ball image 702 is chosen by the disclosed methodology. FIG. 7B shows the circle defined by this chosen sample. FIG. 7C is the scoring determination for the circle defined by this chosen sample. Scoring is performed by counting the number of small circular disks that contains a characteristic point. In this example, 36 of 36 small disks contain a characteristic point for a score of 36/36 or 1.000. An array of the individual disks from this example are shown magnified in FIG. 7D including a disk containing a characteristic point (edgepoint) 708. Iteration of this process constitutes the first stage of the circle RANSAC used to detect the circular image of the reference circle on the ball and to measure its geometric parameters. This measurement might be inaccurate, because the uncropped preprocessed image may contain numerous characteristic points that are not on the circle, so only a small fraction of the iterations may result in a good model that fits the circle well. For this reason the first stage of the process may require relatively large scoring disks to differentiate between models that may not be very good. The tradeoff is that the large scoring disks impair the precision of the measurement made using the best model found during this stage of iterations. Even with many iterations, it may be difficult to be sure with high probability that this circle measurement is accurate, even to a lowered precision.

Final Circle Measurement.

Figures 8A, 8B, 8C:
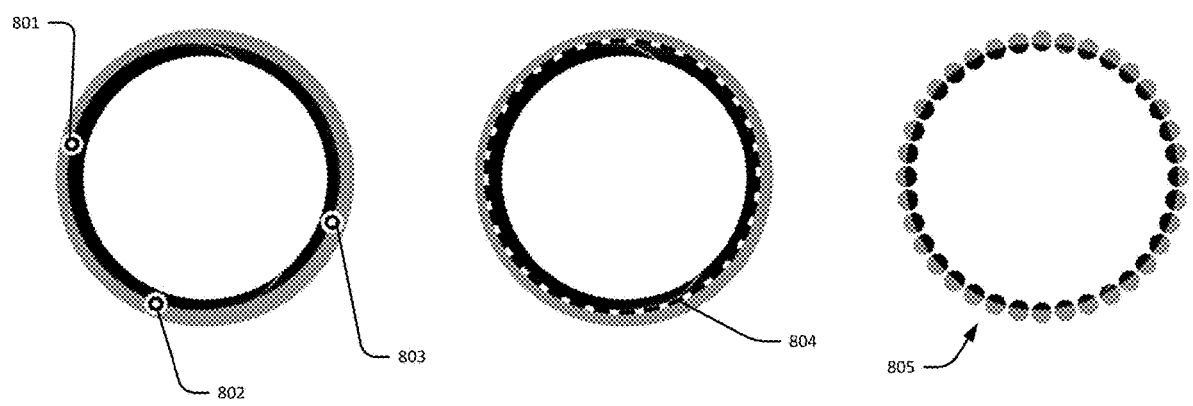
FIGS. 8A-C show cropped images of the ball from FIG. 6A during 3 stages of great circle measurement.

(Illustrated in FIG. 8A-C) FIGS. 8A-C show the final steps for measuring a circle within a selected portion of the image from FIG. 6. Having made a preliminary measurement of the reference circle image using the first stage of the circle RANSAC, the image is cropped to a thin annular strip of image points near this measured circle as shown in FIG. 8A in order to perform a final more precise measurement. The cropped image contains all of the characteristic points that are on the circle, but very few characteristic points that are not on the circle, so a large fraction of the iterations will now result in a model that fits the circle well. In FIG. 8A a random sample of 3 characteristic points 801 802 803 is chosen defining the circle 804 shown in FIG. 8B. In this example which is scored in FIG. 8C, 36 of the 36 circular disks 805 contain a characteristic point (edgepoint) for a score of 1.000. The additional computational cost of the second stage circle RANSAC is relatively small because the efficiency of model generation is high, meaning that a relatively large fraction of models are a good fit to the image circle. This increased efficiency of model generation allows use of smaller scoring discs resulting in higher precision of measurement made using the best circle model from this final second stage of circle measurement.

Initial Semiellipse Measurement.

Figure 9A:
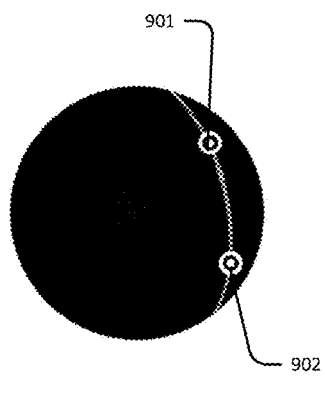
FIGS. 9A-C show cropped images of the ball from FIG. 6A during 3 stages of great circle measurement.

The image of the marked great circle on the ball is a semiellipse contained inside the (image of) the reference circle. Having accurately and precisely measured the geometric parameters of the reference circle with the two stages of circle RANSAC, crop the image to a concentric disk slightly smaller than the reference circle as shown in FIG. 9A. The cropped image retains most of the characteristic points on the semiellipse, but eliminates many of the characteristic points that are not on the semiellipse, increasing the probability that a random sample of characteristic points generates a good semiellipse model. In FIG. 9A a random sample of 2 characteristic points (edgepoints) is shown, however for this embodiment, a random sample of 5 characteristic points is chosen so that the standard formulation of ellipse or semiellipse RANSAC may be used. Model generation is based on a sample of 5 characteristic points. The geometric parameters of the best RANSAC semiellipse determine the orientation parameters of the great circle marked onto the imaged sphere, or ball in this example. Precision and accuracy may be impaired by the requirement to use relatively large disks to ensure generation of good models with appreciable probability. Even with many iterations, it is difficult to ensure with a high probability that this first stage of semiellipse measurement is accurate even to lowered precision.

Final Semiellipse Measurement.

Figure 10A:
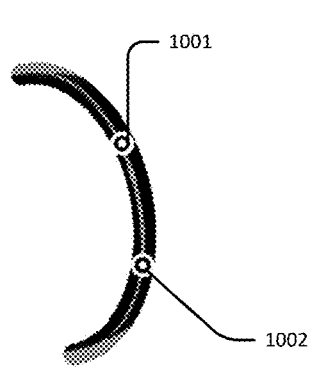
FIGS. 10A-C show cropped images of the ball from FIG. 6A during 3 stages of great circle measurement.
Figure 10B:
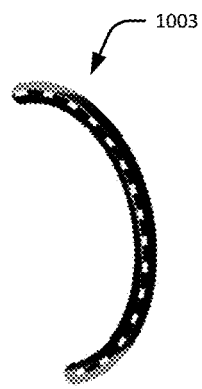
Figure 10C:
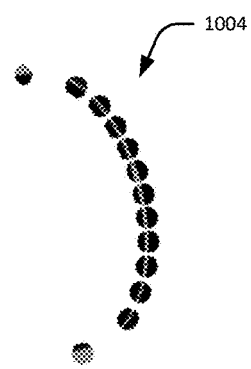

(Illustrated in FIG. 10A-C) FIGS. 10A-C show the final steps for measuring a semiellipse within a selected portion of the image from FIG. 6. Having located the semiellipse with the first stage of the semiellipse RANSAC, the image is cropped to a thin strip of image points near the defined semiellipse as shown in FIG. 10A in order to perform a final more precise measurement of the semiellipse. The cropped image contains all of the characteristic points that are on the semiellipse, but very few characteristic points that are not on the semiellipse, so a large fraction of the iterations will result in a model that fits the semiellipse well. In this embodiment, random samples of 5 characteristic points (edgepoints) are used so that the standard ellipse or semiellipse RANSAC process may be utilized. Model generation is based on selection of samples of 5 characteristic points. 2 of the 5 points are shown in FIG. 10A 1001 1002. In the final phase shown in FIG. 10C, the semiellipse model is scored by calculating the ratio of circular disks on the semiellipse containing a characteristic point. In this example, 13 of 13 of the disks contain a characteristic point (edgepoint) for a score of 1.000. Utilizing this second stage with a cropped portion used for analysis, it is possible to accurately and precisely measure the great circle orientation parameters. The additional computational cost of the second stage semiellipse RANSAC is relatively small because the efficiency of model generation is high, meaning that a relatively large fraction of models are a good fit to the image semiellipse. This increased efficiency of model generation allows use of smaller scoring discs resulting in higher precision of measurement made using the best semiellipse model from this final second stage of circle measurement.

Ellipse and semiellipse RANSAC is computationally far more costly than circle or semicircle RANSAC, because generation of models from samples of 5 characteristic points is far less efficient than generation of models from samples of 3 points.

In various embodiments, the circle model may be described by the following described image processing geometry formulation. Cartesian coordinates are chosen such that every point $x=(x_1, x_2, x_3)$ on the image plane has $x_3=0$, and $c_3+\rho<0$ for a given spherical object with radius $\rho$ and centerpoint $c=(c_1, c_2, c_3)$. The reference circle on the sphere can be parametrized as the spatial curve $$c - (\rho \cos(\tau)i + \rho \sin(\tau)j)$$

as the curve parameter $\tau$ ranges in the interval $0 \le \tau \le 2\pi$. The standard basis vectors are denoted as $i=(1,0,0)$, $j=(0,1,0)$, and $k=(0,0,1)$. The projection of the reference circle to the image plane is then parametrized as the planar curve $$(c_1, c_2) - (\rho \cos(\tau)(1,0) + \rho \sin(\tau)(0,1))$$

as the curve parameter $\tau$ ranges in the interval $0 \le \tau \le 2\pi$. The geometric model parameters of the image circle are the radius $\rho$ and the two Cartesian coordinates of the circle's centerpoint $\underline{c}=(c_1, c_2)$.

Any three distinct points that lie on a circle determine the circle model parameters, as described in the process below. The unwanted possibility that three distinct points in the plane do not lie on any circle necessitates a prior verification described here.

Three distinct points in a plane are denoted by $\underline{p}=(p_1 \cdot p_2)$, $\underline{q}=(q_1, q_2)$ and $\underline{r}=(r_1 \cdot r_2)$. The three points lie on a circle if and only if the number $$L = p_1(q_2 - r_2) + q_1(r_2 - p_2) + r_1(p_2 - q_2)$$

is not equal to zero. In that case the circle has radius $\rho = \sqrt{(p_1-c_1)^2 + (p_2-c_2)^2}$ and centerpoint $\underline{c}=(c_1, c_2)$ where $$c_1 = \frac{1}{2L}(p_1^2(q_2 - r_2) + q_1^2(r_2 - p_2) + r_1^2(p_2 - q_2) - (q_2 - r_2)(r_2 - p_2)(p_2 - q_2)),$$

$$c_2 = -\frac{1}{2L}(p_2^2(q_1 - r_1) + q_2^2(r_1 - p_1) + r_2^2(p_1 - q_1) - (q_1 - r_1)(r_1 - p_1)(p_1 - q_1)).$$

In various embodiments, the semiellipse model may be described by the following image processing geometry formulation. Cartesian coordinates are chosen such that every point $x=(x_1, x_2, x_3)$ on the image plane has $x_3=0$, and $c_3+\rho<0$ for a given spherical object with radius $\rho$ and centerpoint $c=(c_1, c_2, c_3)$. A great circle with orientation vector $u=(u_1, u_2, u_3)$ is marked/visible/distinguishable on the sphere, and this great circle is not the reference circle meaning that u is not a real number multiple of the standard basis vector $k=(0,0,1)$. The upper semicircle on the sphere can be parametrized as the spatial curve $$c - \left(\rho\cos(\tau)\frac{k \times u}{|k \times u|} + \rho\sin(\tau)\frac{(k \times u) \times u}{|(k \times u) \times u|}\right)$$

as the curve parameter $\tau$ ranges in the interval $0 < \tau < \pi$. The projection of the upper semicircle to the image plane is then parametrized as the planar curve $$(c_1, c_2) - \left( \rho\cos(\tau)\frac{(-u_2, u_1)}{\sqrt{u_1^2 + u_2^2}} + \frac{\rho u_3}{\sqrt{u_1^2 + u_2^2 + u_3^2}} \sin(\tau)\frac{(u_1, u_2)}{\sqrt{u_1^2 + u_2^2}} \right)$$

as the curve parameter $\tau$ ranges in the interval $0<\tau<\pi$. This planar curve is a semiellipse, because it is the intersection of a nondegenerate (meaning noncircular) ellipse with a half-plane delineated by the ellipse's major axis. The tilt of a semiellipse is represented by the nonzero tilt vector $(u_1, u_2, u_3)=u$, where the tilt vector u' represents the same tilt if and only if u'=$\lambda$u for some nonzero real number $\lambda$. It is important to note that the great circle orientation is the same as the tilt of its semiellipse image. The tilt is therefore described locally by two geometric model parameters. The circle with radius $\rho$ and centerpoint $\underline{c}=(c_1, c_2)$ will be called the circumcircle of the semiellipse, because it is the circumcircle of the nondegenerate ellipse that contains it. A semiellipse has five total geometric model parameters, two associated to the tilt, and three associated to the circumcircle. The semiellipse model parameter $\rho$ will be called the major radius of a semiellipse, because it is the major radius $\rho$ of the nondegenerate ellipse that contains it. The major radius of a semiellipse is equal to the radius of its circumcircle. The ordered pair of semiellipse parameters $\underline{c}=(c_1, c_2)$ will be called the centerpoint of the semiellipse, because it is the centerpoint of the nondegenerate ellipse that contains it. The centerpoint of a semiellipse is the same as the centerpoint of its circumcircle.

Any five distinct points that lie on a semiellipse determine the five semiellipse geometric model parameters, as seen in the two-step process below. But the unwanted possibility that five points on the plane do not lie on any semiellipse necessitates prior verification for each step:

As an explanation of the geometric formulation in this embodiment the following is provided. Given $\underline{p}=(p_1, p_2)$, $\underline{p}=(p_1, p_2)$, $\underline{r}=(r_1, r_2)$, $\underline{s}=(s_1, s_2)$, and $\underline{t}=(t_1, t_2)$ to be five distinct points in the plane.

As the first step, verify that the five points lie on a nondegenerate ellipse and in that event generate the 3 geometric model parameters of its circumcircle. First given (A, B, C, D, F, G) to be a nonzero solution for the linear system $$\begin{bmatrix} p_1^2 & 2p_1p_2 & p_2^2 & p_1 & p_2 & 1 \\ q_1^2 & 2q_1q_2 & q_2^2 & q_1 & q_2 & 1 \\ r_1^2 & 2r_1r_2 & r_2^2 & r_1 & r_2 & 1 \\ s_1^2 & 2s_1s_2 & s_2^2 & s_1 & s_2 & 1 \\ t_1^2 & 2t_1t_2 & t_2^2 & t_1 & t_2 & 1 \end{bmatrix} \begin{bmatrix} A \\ B \\ C \\ D \\ F \\ G \end{bmatrix} = \begin{bmatrix} 0 \\ 0 \\ 0 \\ 0 \\ 0 \end{bmatrix}$$

and given $$\Delta = \det\begin{bmatrix} A & B & D \\ B & C & F \\ D & F & G \end{bmatrix},$$

$$J = \det\begin{bmatrix} A & B \\ B & C \end{bmatrix},$$

$$I = A + C.$$

Then the five points lie on an ellipse if and only if the following conditions are verified:

$$\Delta \neq 0,$$

$$J > 0,$$

$$\frac{\Delta}{I} < 0.$$

In this case the ellipse is nondegenerate if and only if $I^2-4J\neq 0$. In that case the circumcircle of this nondegenerate ellipse has radius $$\rho = \sqrt{\frac{2\Delta}{J(\sqrt{I^2 - 4J} - I)}}$$

and centerpoint $$(c_1, c_2) = \left( \frac{BF - CD}{J}, \frac{BD - AF}{J} \right).$$

As the second step verify that the five points lie on a semiellipse and in that event generate a tilt vector of this semiellipse. Suppose the five points lie on a nondegenerate ellipse whose circumcircle has radius $\rho$ and centerpoint $\underline{c}=(c_1, c_2)$ as determined in the first step. Then the five points lie on a semiellipse with tilt vector $u=(u_1, u_2, u_3)$ if and only if the following inequalities are verified $$\rho^2-(-p_1-c_1)^2-(p_2-c_2)^2>0,$$

$$\rho^2-(q_1-c_1)^2-(q_2-c_2)^2>0,$$

$$\rho^2-(r_1-c_1)^2-(r_2-c_2)^2>0,$$

$$\rho^2-(s_1-c_1)^2-(s_2-c_2)^2>0,$$

$$\rho^2-(t_1-c_1)^2-(t_2-c_2)^2>0$$

and furthermore $u=(u_1, u_2, u_3)$ is a solution of the linear system $$\begin{bmatrix} (p_1-c_1) & (p_2-c_2) & \sqrt{\rho^2 - (p_1-c_1)^2 - (p_2-c_2)^2} \\ (q_1-c_1) & (q_2-c_2) & \sqrt{\rho^2 - (q_1-c_1)^2 - (q_2-c_2)^2} \\ (r_1-c_1) & (r_2-c_2) & \sqrt{\rho^2 - (r_1-c_1)^2 - (r_2-c_2)^2} \\ (s_1-c_1) & (s_2-c_2) & \sqrt{\rho^2 - (s_1-c_1)^2 - (s_2-c_2)^2} \\ (t_1-c_1) & (t_2-c_2) & \sqrt{\rho^2 - (t_1-c_1)^2 - (t_2-c_2)^2} \end{bmatrix} \begin{bmatrix} u_1 \\ u_2 \\ u_3 \end{bmatrix} = \begin{bmatrix} 0 \\ 0 \\ 0 \\ 0 \\ 0 \end{bmatrix}.$$

Therefore, if the five points lie on a semiellipse then a tilt vector $u=(u_1, u_2, u_3)$ of the semiellipse can be computed by solving for a nonzero solution of the linear system.

Note that the first step generates just the model of the circumcircle of the semiellipse from the five points.

The second step generates the actual semiellipse model from the five points and the circumcircle.

Ellipse and semiellipse model generation may involve an ill-conditioned linear system. This issue is particularly pronounced if the semiellipse image has orientation that is almost parallel with the image plane (the semiellipse looks almost like a line segment passing through the center of the disk). Then very small errors of some or all of the five sample points on the semiellipse can lead to very large errors in the geometric model parameters.

In certain embodiments, an improved methodology is implemented which simplifies the semiellipse measurement by reducing the number of points defining a semiellipse model from 5 to 2. This methodology increases computational efficiency and improves measurement accuracy as described below.

The basic embodiment described above utilizes the fact that the semiellipse is contained inside the circle. Another more specific relationship between the semiellipse and the circle may be considered. The image of the reference circle on a sphere is the circumcircle of the semiellipse image of a great circle on the sphere. Therefore the image contains a constrained semiellipse, subject to the constraint that the imaged ellipse's circumcircle coincides with a visible circle that is already present on the image. Embodiments utilizing this improved method are based on measuring an entire circumscribed semiellipse, consisting of both a semiellipse and its circumcircle, on the image.

Certain embodiments may use one noted available method to generate circumscribed semiellipse models by noting and using the fact that the generation of a semiellipse from 5 points already generates the geometric model parameters of the circumcircle. For this methodology the scoring step is modified to score the circumcircle model as well as the semiellipse model that is already scored, and add the two scores together. This does not lead to a significant increase in model generation efficiency, because the same models are generated. But the scoring is improved, so this method may be able to do a better job discerning between two good models, increasing the precision of orientation parameter measurement.

Certain embodiments utilize yet another method which is to only generate constrained semiellipse models, where the constraint is that the circumcircle of the semiellipse model must match the already measured circle on the image. Measurement of such a constrained/circumscribed semiellipse image may broken up as two separate measurements. In the first measurement the radius $\rho$ and centerpoint $\underline{c}=(c_1, c_2)$ of the circumcircle is measured by the image analysis methodology described above. Since the semiellipse is constrained/circumscribed by this measured circumcircle, only the tilt of the semiellipse needs to be measured in the second measurement. The tilt accounts for 2 of the 5 geometric model parameters of a semiellipse. The remaining 3 geometric parameters of the semiellipse, namely the radius $\rho$ and the two coordinates of the centerpoint $\underline{c}=(c_1, c_2)$, have already been measured. Therefore a sample of only 2 characteristic points suffices to generate a constrained semiellipise model, as detailed below. Model generation for a constrained semiellipse is far more efficient than model generation for an arbitrary semiellipse (or ellipse), resulting in faster and more precise measurement within given computational time constraints. This is because a random sample of 2 characteristic points is then far more likely to consist of points entirely on the semiellipse than is a sample of 5 characteristic points. In an example where ¼ of the characteristic points are on the semiellipse, the probability that a random sample of 5 points results in a good semiellipse model is 1/1024=0.001. In comparison the probability that a random sample of 2 points results in a good constrained semiellipse model is 1/16=0.063.

The first two steps of the process in this embodiment of the methodology are identical to the first two steps of the basic embodiment process described above:

Initial Circle Measurement.

(Illustrated in FIGS. 6 and 7) In various embodiments the disclosed methodology performs appropriate preprocessing of contrast, color, and/or edge detection (FIGS. 6A and 6B). The steps in FIGS. 6C-6E are repeated until the best consensus circle is a good model of the image circle with high probability. In FIG. 6C, a random sample of 3 characteristic points 605 607 608 on the edge of the black region of the ball image 606 is chosen by the disclosed methodology. FIG. 6D shows the circle defined by this chosen sample. FIG. 6E is the scoring determination for the circle defined by this chosen sample. Scoring is performed by counting the number of small circular disks that contains a characteristic point. In this example, 4 of 36 small disks contain a characteristic point for a score of 4/36 or 0.111. An array of the individual disks from this example are shown magnified in FIG. 6F including a disk containing a characteristic point (edgepoint in this examplar) 612 and a disk not containing a characteristic point (edge point) 613. In FIG. 7A, a different random sample of 3 characteristic points 701 703 704 on the edge of the black region of the ball image 702 is chosen by the disclosed methodology. FIG. 7B shows the circle defined by this chosen sample. FIG. 7C is the scoring determination for the circle defined by this chosen sample. Scoring is performed by counting the number of small circular disks that contains a characteristic point. In this example, 36 of 36 small disks contain a characteristic point for a score of 36/36 or 1.000. An array of the individual disks from this example are shown magnified in FIG. 7D including a disk containing a characteristic point (edgepoint) 708. Iteration of this process constitutes the first stage of the circle RANSAC used to detect and measure the geometric parameters for the circular image of the reference circle on the ball. This measurement might be inaccurate, because the uncropped preprocessed image may contain numerous characteristic points that are not on the circle, so only a small fraction of the iterations may result in a good model that fits the circle well. For this reason the first stage of the process may require relatively large scoring disks to differentiate between models that may not be very good. The tradeoff is that the large scoring disks impair the precision of the measurement made using the best model found during this stage of iterations. Even with many iterations, it may be difficult to be sure with high probability that this circle measurement is accurate, even to a lowered precision.

Final Circle Measurement.

(Illustrated in FIG. 8A-C) FIGS. 8A-C show the final steps for measuring a circle within a selected portion of the image from FIG. 6. Having located the reference circle with the first stage of the circle RANSAC, the image is cropped to a thin annular strip of image points near the defined circle as shown in FIG. 8A in order to perform a final more precise measurement of the circle. The cropped image contains all of the characteristic points that are on the circle, but very few characteristic points that are not on the circle, so a large fraction of the iterations will now result in a model that fits the circle well. In FIG. 8A a random sample of 3 characteristic points 801 802 803 is chosen defining the circle 804 shown in FIG. 8B. In this example which is scored in FIG. 8C, 36 of the 36 circular disks 805 contain a characteristic point (edgepoint) for a score of 1.000. The additional computational cost of the second stage circle RANSAC is relatively small because the efficiency of model generation is high, meaning that a relatively large fraction of models are a good fit to the image circle. This increased efficiency of model generation allows use of smaller scoring discs resulting in higher precision of measurement made using the best circle model from this final second stage of circle measurement.

Initial Constrained Semiellipse Measurement.

Figure 9B:
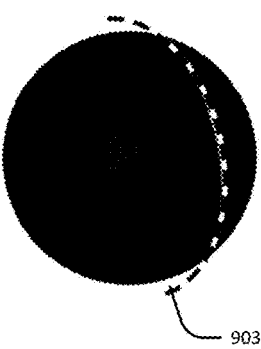
Figure 9C:
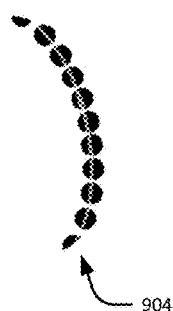

The image of the marked great circle on the ball is a semiellipse contained inside the reference circle. Having accurately and precisely measured the reference circle with the two stages of circle RANSAC, crop the image to a concentric disk slightly smaller than the reference circle as shown in FIG. 9A. The cropped image retains most of the characteristic points on the semiellipse, but eliminates many of the characteristic points that are not on the semiellipse, increasing the probability that a random sample of characteristic points is good. In this embodiment, a constrained semiellipse model is used to measure the semi-elliptical image of the great circle. The additional benefit of utilizing a constrained semiellipse for model generation is that just 2 points are necessary to define the constrained semiellipse. Thus, model generation is based on selection of only 2 characteristic points. In FIG. 9A an exemplar random sample of 2 characteristic points 901 and 902 is shown. In FIG. 9B the defined semiellipse model is shown 903. In FIG. 9C the semiellipse circular scoring disks are shown 904. The geometric parameters of the best RANSAC constrained semiellipse determine the orientation parameters of the great circle marked onto the imaged sphere, or ball in this example. Precision and accuracy may be impaired by the requirement to use relatively large disks to ensure generation of good models with appreciable probability. Even with many iterations, it is difficult to ensure with a high probability that the constrained semiellipse measurement is accurate even to lowered precision. Thus a second stage constrained semiellipse RANSAC is performed.

Final Constrained Semiellipse Measurement.

(Illustrated in FIG. 10A-C) FIGS. 10A-C show the final steps for measuring a constrained semiellipse within a selected portion of the image from FIG. 6. Having located the semiellipse with the first stage of the constrained semiellipse RANSAC, the image is cropped to a thin strip of image points near the defined semiellipse as shown in FIG. 10A in order to perform a final more precise measurement of the constrained semiellipse. The cropped image contains all of the characteristic points that are on the constrained semiellipse, but very few characteristic points that are not on the constrained semiellipse, so a large fraction of the iterations will result in a model that fits the constrained semiellipse well. This embodiment uses a constrained semiellipse process to measure the semielliptical image of the great circle. Model generation is based on selection of 2 characteristic points. An examplar random sample of 2 characteristic points 1001 1002 is shown in FIG. 10A. The defined semiellipse 1003 is shown in FIG. 10B. In the final phase shown in FIG. 10C, the constrained semiellipse is scored by calculated the ratio of circular disks 1004 containing a characteristic point (edgepoint). In this example, 13 of 13 of the scoring disks contain a characteristic point for a score of 1.0. Utilizing this second stage with a cropped portion used for analysis, it is possible to accurately and precisely measure the orientation of the great circle on the sphere. The additional computational cost of the second stage constrained semiellipse RANSAC is relatively small because the efficiency of model generation is high, meaning that a relatively large fraction of models are a good fit to the image semiellipse. Geometric parameters of the modelled semiellipse are utilized in the computation of the great circle orientation parameters as detailed below.

Details of this embodiment of the invention are presented here. In this embodiment any two points on a constrained semiellipse determine the semiellipse if the circumcircle of the semiellipse is already known. Furthermore, the verification step required for a semiellipse is not needed for a constrained semiellipse.

In this embodiment, the constrained semiellipse with already known circumcircle is generated. Let $\underline{s}=(s_1, s_2)$ and $\underline{t}=(t_1, t_2)$ be two distinct points in the plane. Then the two points lie on a constrained semiellipse whose circumcircle has radius $\rho$ and centerpoint $\underline{c}=(c_1, c_2)$ if and only if each point lies inside the circumcircle. In this case $$\rho^2-(s_1-c_1)^2-(s_2-c_2)^2>0,$$

$$\rho^2-(t_1-c_1)^2-(t_2-c_2)^2>0$$

and a nonzero vector $u=(u_1, u_2, u_3)$ is a tilt vector of the semiellipse if and only if it is a solution of the linear system $$\begin{bmatrix} (s_1-c_1) & (s_2-c_2) & \sqrt{\rho^2-(s_1-c_1)^2-(s_2-c_2)^2} \\ (t_1-c_1) & (t_2-c_2) & \sqrt{\rho^2-(t_1-c_1)^2-(t_2-c_2)^2} \end{bmatrix} \begin{bmatrix} u_1 \\ u_2 \\ u_3 \end{bmatrix} = \begin{bmatrix} 0 \\ 0 \end{bmatrix}.$$

Equivalently a nonzero vector $u=(u_1, u_2, u_3)$ is a tilt vector of the semiellipse if and only if it is orthogonal to each of the two vectors $$(s-c)=((s_1-c_1),(s_2-c_2),\sqrt{\rho^2-(s_1-c_1)^2-(s_2-c_2)^2}),$$

$$(t-c)=((t_1-c_1),(t_2-c_2),\sqrt{\rho^2-(t_1-c_1)^2-(t_2-c_2)^2}).$$

The notation utilized herein is s is the unique point on the upper hemisphere that projects to $\underline{s}$, and similarly for t. Therefore a tilt vector for the semiellipse can easily be computed as the cross-product $u=(s-c)\times(t-c)$ with components given by $$u_1=(s_2-c_2)\sqrt{\rho^2(t_1-c_1)^2-(t_2-c_2)^2}-(t_2-c_2)\sqrt{\rho^2-(s_1-c_1)^2-(s_2-c_2)^2},$$

$$u_2=(t_1-c_1)\sqrt{\rho^2-(s_1-c_1)^2-(s_2-c_2)^2}-(s_1-c_1)\sqrt{\rho^2-(t_1-c_1)^2-(t_2-c_2)^2},$$

$$u_3=(s_1-c_1)(t_2-c_2)-(t_1-c_1)(s_2-c_2).$$

Note that this vector $u=(u_1, u_2, u_3)$ is also a great circle orientation vector for the great circle on the sphere, so a measurement of geometric parameters of the semiellipse yields a measurement of orientation parameters of the great circle.

Figure 11A:
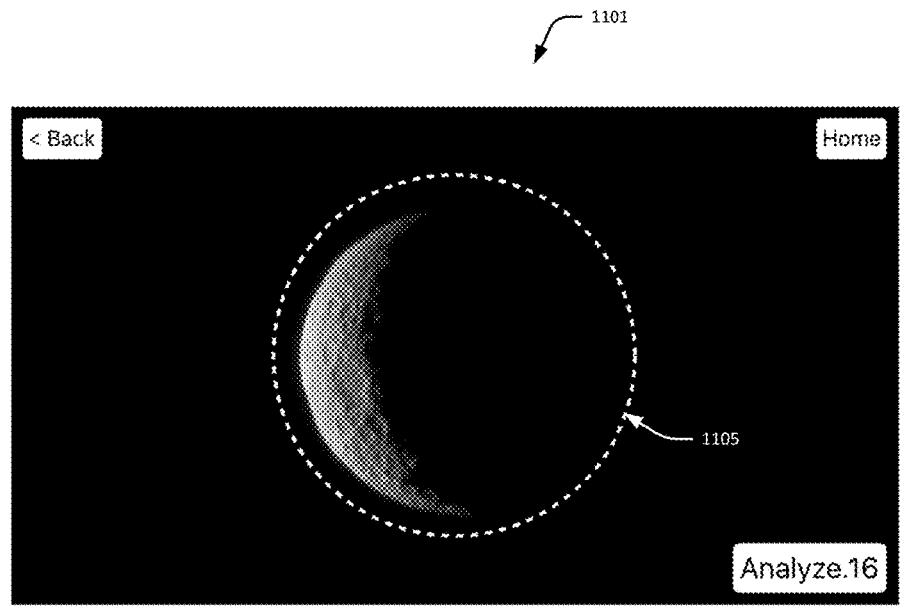
FIG. 11A shows an image of the planetary body Ceres with a selected region of interest for analysis.
Figure 11B:
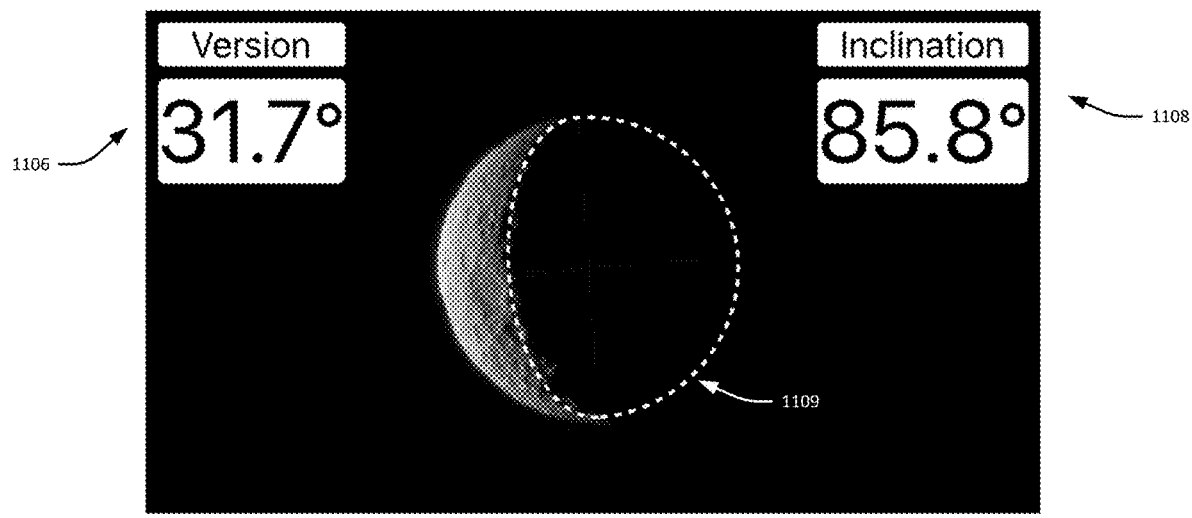
FIG. 11B shows an image of the planetary body Ceres with an outline of the unlit hemisphere complementary to the measured lit hemisphere and corresponding values for version and inclination measured by image analysis in a disclosed embodiment.

In an alternate embodiment for the hemisphere orientation processes described herein, spacecraft navigation relative to a planetary body is performed. Utilizing the system components from FIG. 4 and either of the embodiment processes above, the sunlight lit and unlit hemispheres of a planetary body are identified in an image captured by a camera aboard a probe or other interplanetary vehicle, and the direction vector from the planetary body to the sun is measured as the hemisphere orientation. Although a user interface is not required for such an embodiment when used as autonomous navigation, optional embodiment exemplar displays are shown in FIGS. 11A and 11B. In FIG. 11A an image of the planetary body Ceres is shown. In FIG. 11A an automated analysis region is shown 1101 as well as the image of the partially lit planetary body 1105. Following application of one of the earlier described process embodiments. the hemisphere is modelled 1109 as shown in the optional display screen which here shows the version angle 1106 and inclination angle 1108 orientation parameters describing the measured hemisphere orientation.

Figure 12A:
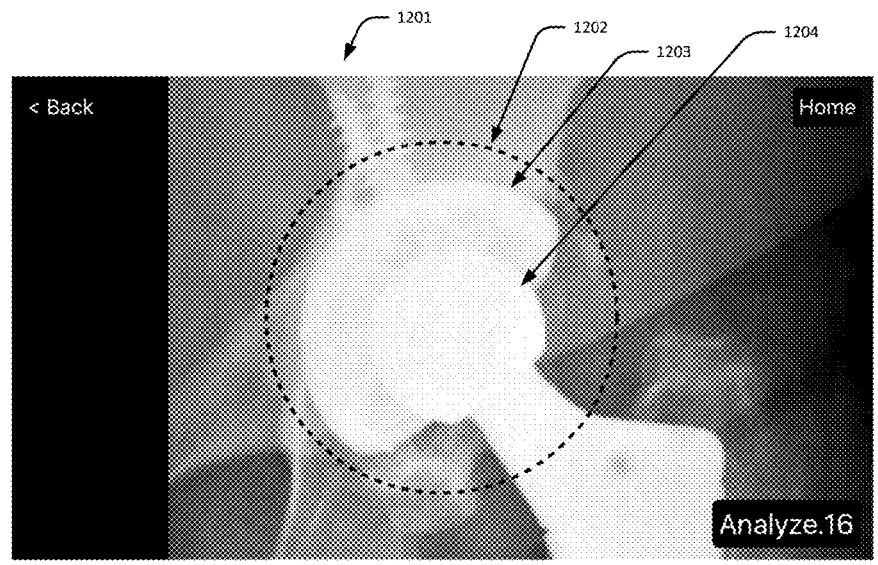
FIG. 12A shows an x-ray image of an artificial hip with a selected region of interest for analysis.
Figure 12B:
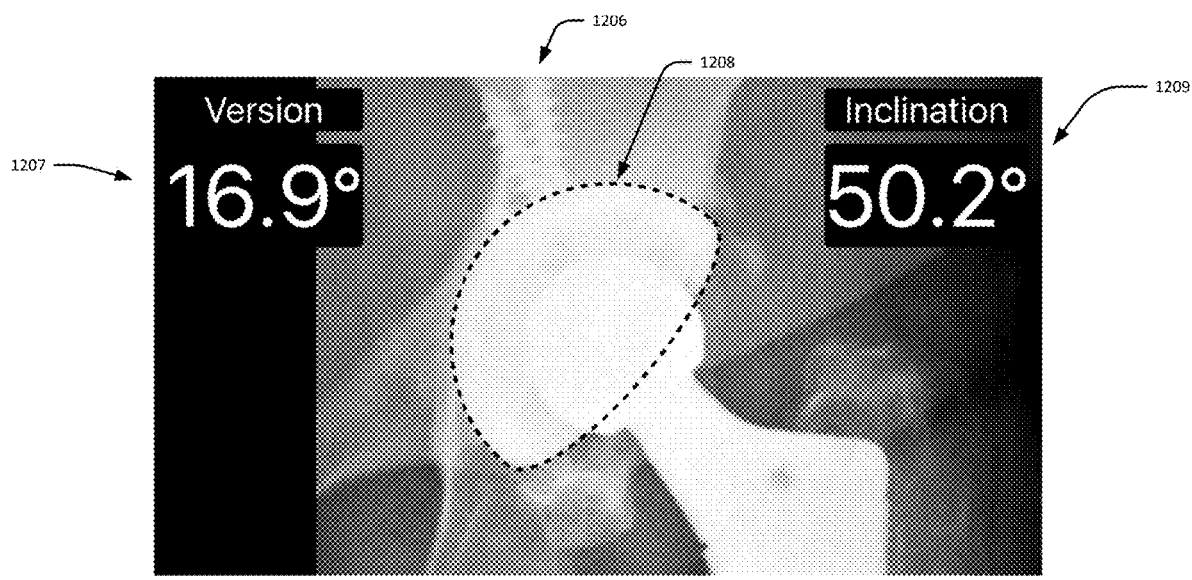
FIG. 12B shows an x-ray image of an artificial hip with an outline of the measured hemispherical cup component and corresponding values for version and inclination measured by image analysis in a disclosed embodiment.

In an alternate embodiment, one of the earlier described process embodiments may be used to measure hemisphere orientation of an artificial hip socket (acetabular component or cup) in an x-ray image. Exemplar displays for this embodiment are shown in FIGS. 12A and 12B. In FIG. 12A, a region selection 1202 interface 1201 is shown which is in certain embodiments identified by a user. The selection region contains both the target socket (acetabular component) 1203 and ball end (femoral component) 1204 of the artificial hip joint. Since the selection region is considerably more complex than a simple marked great circle, image smoothing and edge detection parameters are determined empirically. X-ray imaging is transmissive and sees both upper and lower hemispheres, so hemisphere orientation (as point on unit sphere) is only determined up to reflection in the image plane. Following a successful implementation of one of the process embodiments disclosed above, the output interface 1206 in FIG. 12B is shown. Shown in this exemplar interface is the identified and measured artificial hip socket 1208 model outline. The anteversion angle 1207 and inclination angle 1209 orientation parameters describing the measured hemisphere orientation are shown.

FIGS. 36A and 36B are images of an orange half which are illustrative of embodiments utilized to identify hemisphere orientation, such as the artificial hip socket in an x-ray or fluoroscope image. The steps of the hip socket hemisphere orientation measurement process are detailed in FIGS. 13-18. In these figures, the exemplar images are shown with inverted grayscale as displayed by some fluoroscope x-ray machines. The great circle on the hemisphere is visible in the reflective image (photograph) of FIG. 36A as an ellipse 3603. The great circle on the hemisphere is visible in the transmissive image (silhouette or x-ray) in FIG. 36B as a semiellipse 3604. The disclosed methods for measuring a tilt vector of a semiellipse determine an orientation vector for the great circle up to reflection in the image plane. This measures the hemisphere orientation up to reflection in the image plane.

Initial Circle Measurement.

Figure 13A:
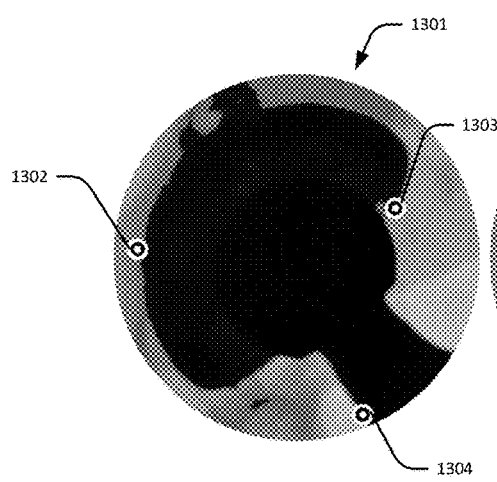
FIGS. 13A-C show cropped x-ray images of an artificial hip during 3 stages of great circle measurement in a disclosed embodiment.
Figure 13B:
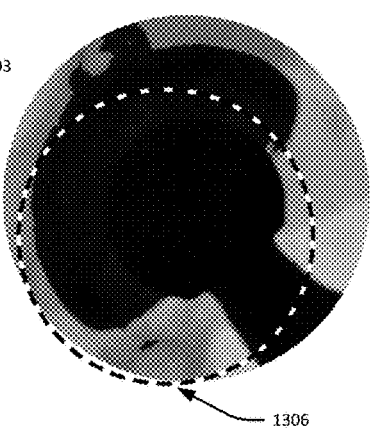
Figure 13C:
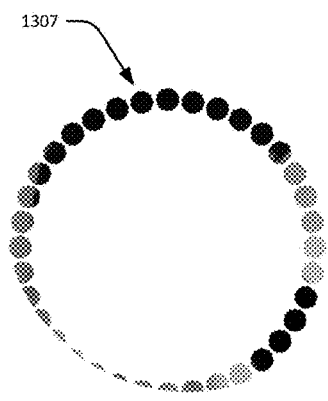
Figures 14A, 14B, 14C:
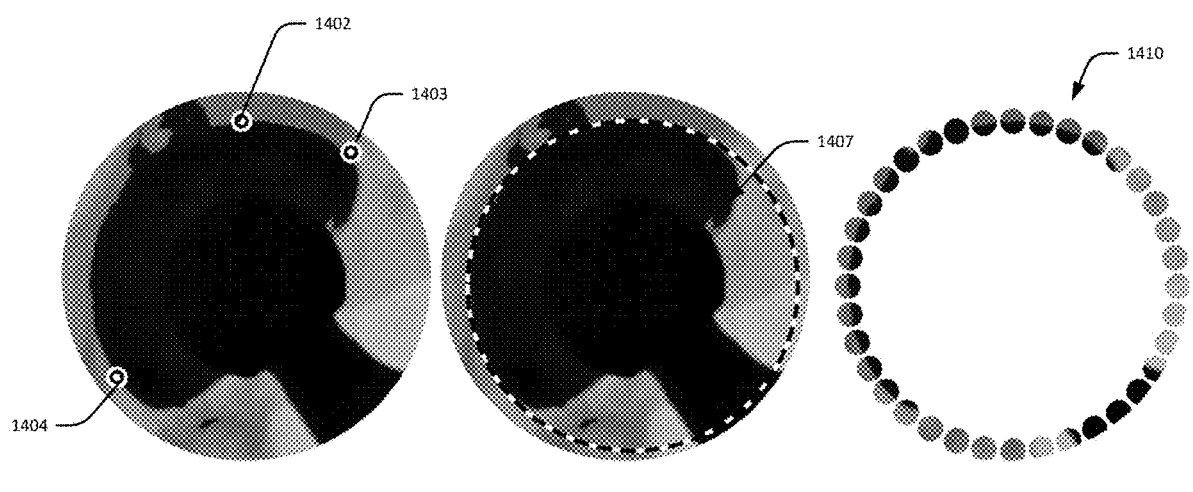
FIGS. 14A-C show cropped x-ray images of an artificial hip during 3 stages of great circle measurement in a disclosed embodiment.

FIG. 13 shows an iteration used in the initial circle measurement. In FIG. 13A a circular selection region 1301 is shown with an exemplar random sample of 3 characteristic points (edgepoints) 1302 1303 and 1304 identified. The circle 1306 defined by the characteristic point sample from FIG. 13A is shown in FIG. 13B. The circular scoring disks 1307 are shown in FIG. 13C. The score is computed by counting for each semicircle contained in the circle the fraction of discs that contain a characteristic point. The score for FIG. 13C is 4/18, indicating that the circle 1306 is not a good fit to the visible semicircular edge of the implant image in FIG. 13B. FIG. 14 shows another iteration used in the initial circle measurement. In FIG. 14A a circular selection region is shown with a different exemplar random sample of 3 characteristic points 1402 1403 and 1404 identified. The circle 1407 defined by the characteristic point sample from FIG. 14A is shown in FIG. 14B. The circular scoring disks 1410 are shown in FIG. 14C. The score for FIG. 14C is 17/18, indicating that the circle 1407 is a good fit to the visible semicircular edge of the implant image in FIG. 14B. The process is iteratively repeated and the result of the initial circle measurement is comprised of the geometric parameters for the best circle found during these iterations.

Final Circle Measurement.

Figures 15A, 15B, 15C:
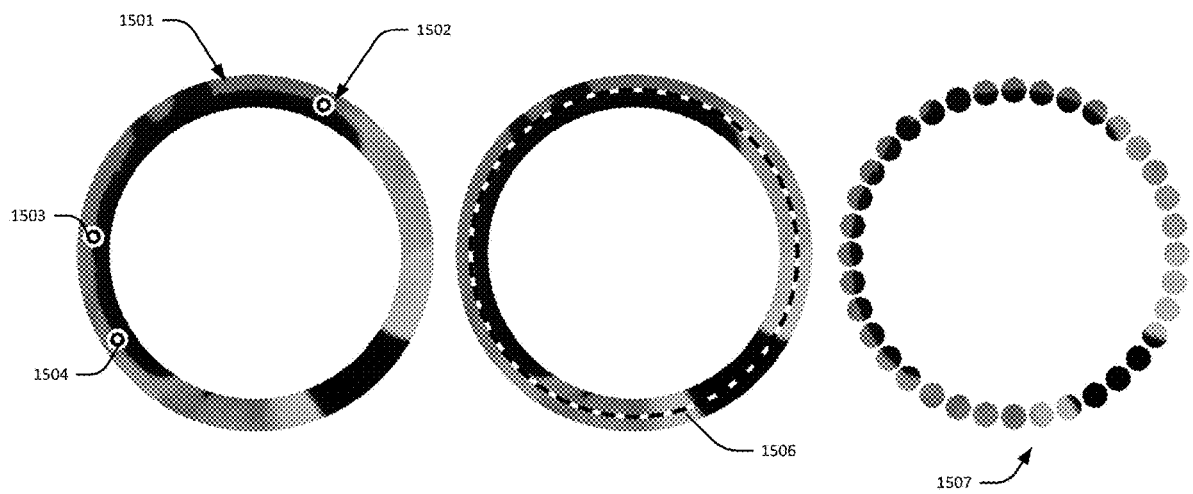
FIGS. 15A-C show cropped x-ray images of an artificial hip during 3 stages of great circle measurement in a disclosed embodiment.

FIGS. 15A-C show an iteration used in the final circle measurement. The best circle from the preceding initial circle measurement process is used to crop the image to the set of image points forming an annular ring 1501 as shown in FIG. 15A. In FIG. 15A a circular selection region is shown with a different exemplar random sample of 3 characteristic points (edgepoints) 1502 1503 and 1504 identified. The circle 1506 defined by the characteristic point sample from FIG. 15A is shown in FIG. 14B. The circular scoring disks 1507 are shown in FIG. 15C. The score for FIG. 15C is 17/18, indicating that the circle 1506 is a good fit to the visible semicircular edge of the implant image in FIG. 15B. The process is iteratively repeated and the result of the final circle measurement is comprised of the geometric parameters for the best circle found during these iterations.

Initial Constrained Semi-Ellipse Measurement.

Figure 16A:
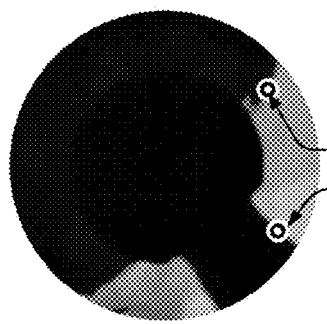
FIGS. 16A-C show cropped x-ray images of an artificial hip during 3 stages of great circle measurement in a disclosed embodiment.
Figure 16B:
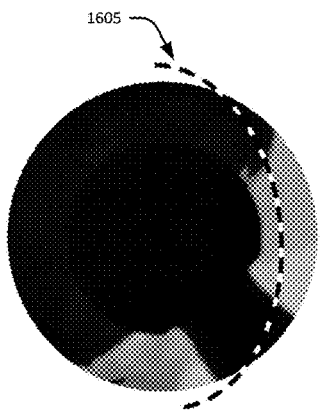
Figure 16C:
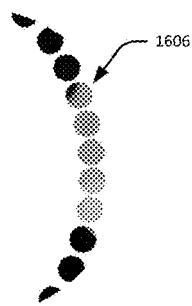
Figure 17A:
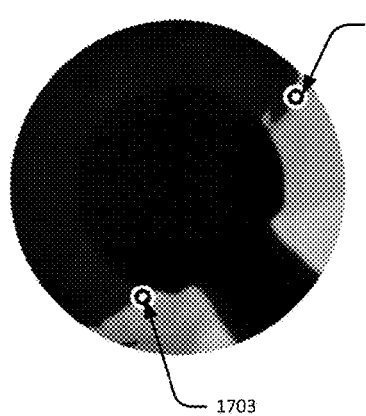
FIGS. 17A-C show cropped x-ray images of an artificial hip during 3 stages of great circle measurement in a disclosed embodiment.
Figure 17B:
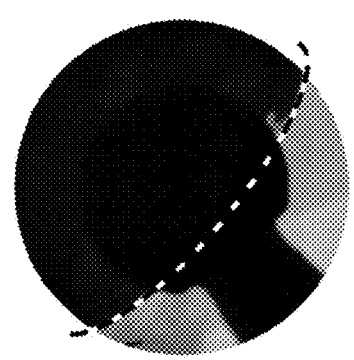
Figure 17C:
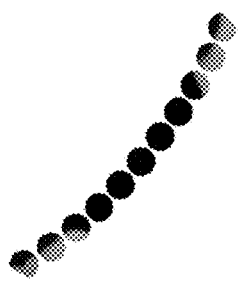

Having accurately and precisely measured the reference circle with the two stages of circle RANSAC, crop the image to a concentric disk slightly smaller than the reference circle as shown in FIG. 16A. The cropped image retains most of the characteristic points on the semiellipse, but eliminates many of the characteristic points that are not on the semiellipse, increasing the probability that a random sample of points is good. In this embodiment, a constrained semiellipse model is used to measure the semi-elliptical image of the great circle. FIGS. 16A-C show an iteration used in the initial constrained semiellipse measurement. In the constrained semiellipse process, only 2 points are needed to define the semiellipse. FIG. 16A shows a sample of 2 randomly selected characteristic points (edgepoints) 1602 and 1603. The constrained semiellipse 1605 defined by the characteristic point sample in 16A is shown in FIG. 16B. FIG. 16C shows the respective scoring disks 1606 corresponding to the constrained semiellipse in FIG. 16B. The score is 2/13 disks containing an characteristic point indicating that the semiellipse 1605 is not a good fit to the portion of the semi-elliptical edge visible in FIG. 16B (some of the 13 scoring disk are not visible against the white regions of the cropped image). FIG. 17 shows another iteration used in the initial constrained semicircle measurement. FIG. 17A shows a different sample of 2 randomly selected characteristic points 1702 and 1703. The constrained semiellipse defined by the characteristic point sample in 17A is shown in FIG. 17B. FIG. 17C shows the respective scoring disks corresponding to the constrained semiellipse in FIG. 17B. The score is 6/13 disks containing an characteristic point indicating that the semiellipse 1605 is a better fit to the portion of the semi-elliptical edge visible in FIG. 16B (some of the 13 scoring disk are not visible against the white regions of the cropped image). The process is iteratively repeated and the result of the initial constrained semiellipse measurement is comprised of the geometric parameters for the best semiellipse found during these iterations.

Final Constrained Semi-Ellipse Measurement.

Figures 18A, 18B, 18C:
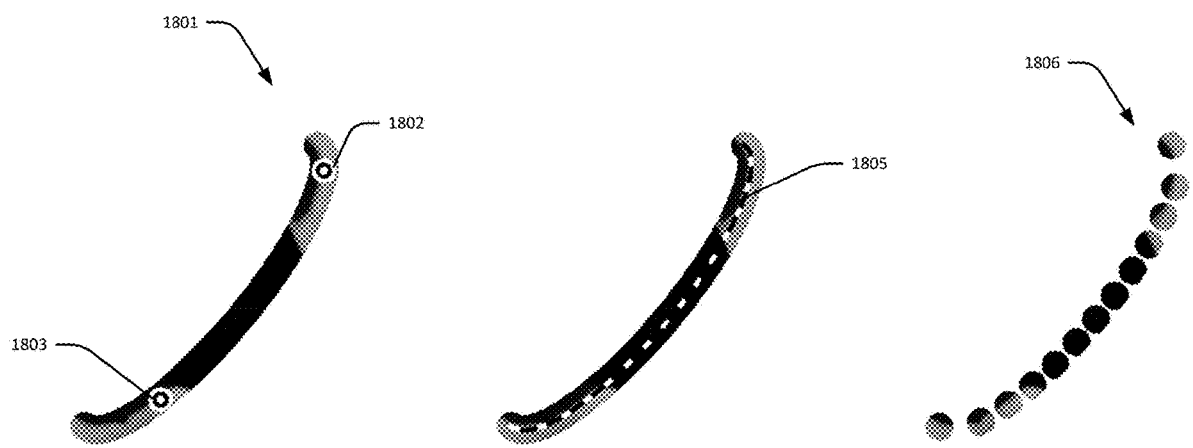
FIGS. 18A-C show cropped x-ray images of an artificial hip during 3 stages of great circle measurement in a disclosed embodiment.

FIGS. 18A-C show an iteration used in the final constrained semiellipse measurement. The best constrained semiellipse from the preceding initial constrained semiellipse measurement process is used to crop the image to the set of nearby image points 1801 as shown in FIG. 18A. FIG. 18A shows a sample of 2 randomly selected characteristic points (edgepoints) 1802 and 1803. The constrained semiellipse 1805 defined by the characteristic point sample in 18A is shown in FIG. 18B. FIG. 18C shows the respective scoring disks 1806 corresponding to the constrained semiellipse in FIG. 18B. The score is 8/13 disks containing a characteristic point indicating that the semiellipse 1805 is a good fit to the portion of the semi-elliptical edge visible in FIG. 18B (some of the 13 scoring disk are not visible against the white regions of the cropped image). The process is iteratively repeated and the result of the final constrained semiellipse is comprised of the geometric parameters for the best semiellipse found during these iterations. The tilt vector of the best semiellipse, or its reflection in the image plane, is an orientation vector for the great circle at the edge of the hemispherical hip implant cup.

In an alternate embodiment which utilizes one of the processes disclosed above for measuring great circles, images from successive video frames of a basketball in motion are analyzed. Due to the conservation of angular momentum, the rotation of a basketball between consecutive video frames is constant while a basketball remains untouched in free flight. In this embodiment the visible great circle markings on a standard basketball are measured in a series of three consecutive video frames during free flight, and the rotation of the basketball between the successive frames is computed from these measurements. If a player touches the ball the resulting change in the ball's angular momentum is reflected in a change of the rotation between successive video frames. Measurements from two series of video frames, one series of three frames before a disputed player touch and one series of three frames after the touch, are combined to conclusively determine whether or not a player touch occurred. This is useful in making correct refereeing decisions based on analysis of instant replay or real time video from a basketball game.

Figure 19A:
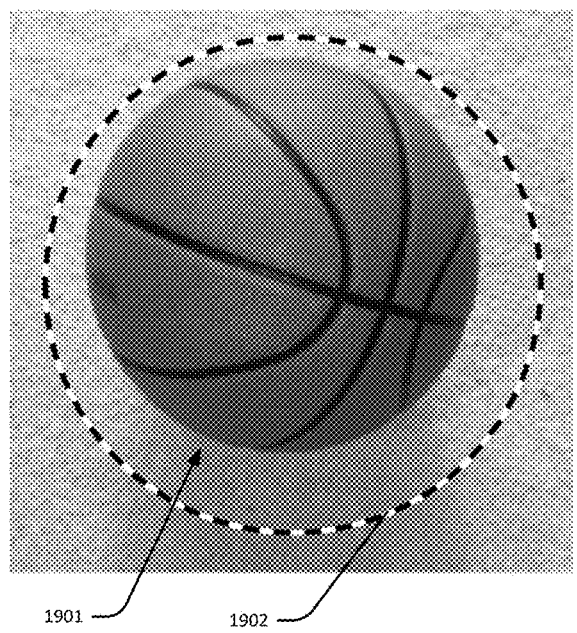
FIGS. 19A-B show exemplar images of a basketball in 2 object orientations with selected regions of interest for analysis.
Figure 19B:
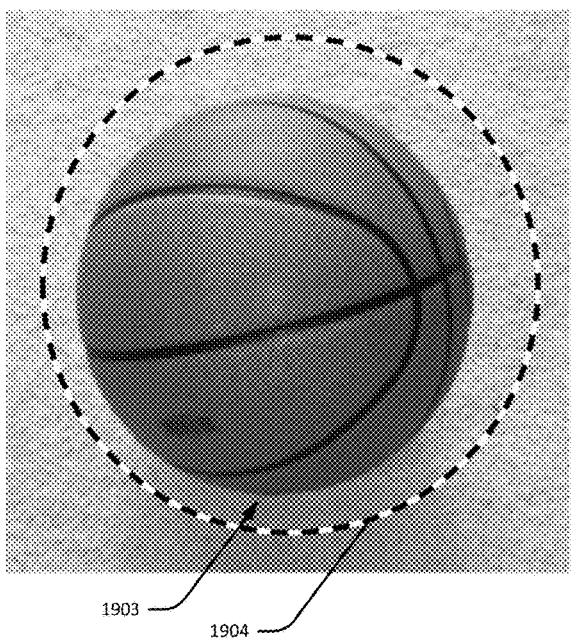
Figure 35A:
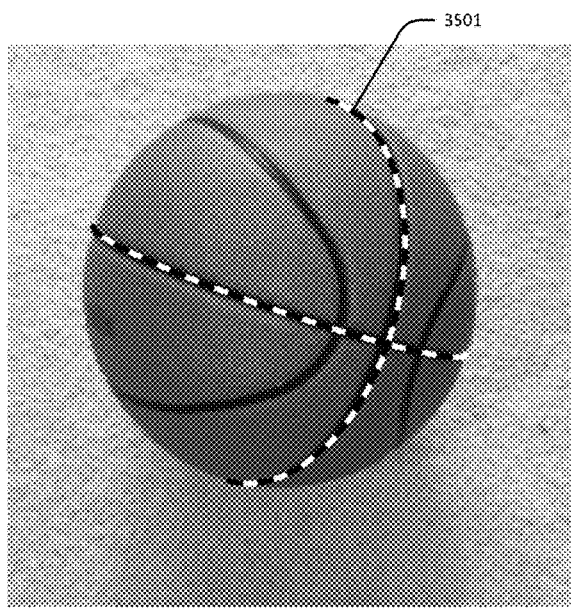
FIGS. 35A-B show images of a basketball in 2 object orientations with its visible marked great circles highlighted.
Figure 35B:
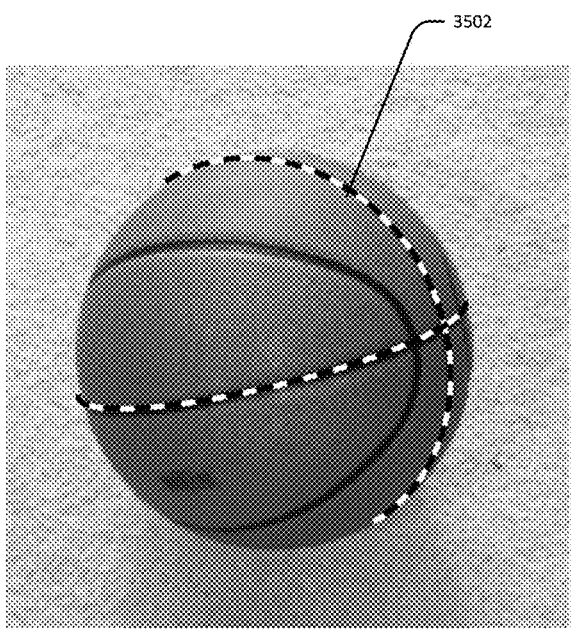

The pair of FIGS. 19A and 19B show images of a basketball 2 different ball orientations 1901 and 1902, illustrative of the change in ball orientation that occurs between successive video frames of a basketball in free flight. Region selection circles 1902 and 1904 are also shown. These may be obtained automatically or manually through a user interface. The visible markings on a standard basketball include a pair of great circles. The great circles are orthogonal in the sense that their orientation vectors are orthogonal. Each of these two great circles appears in an image as a semiellipse. FIG. 35A highlights the pair of semiellipses 3501 corresponding to the pair of visible marked great circles in FIG. 19A. FIG. 35B highlights the pair of semiellipses 3602 corresponding to the pair of visible marked great circles in FIG. 19B. The other visible markings on a basketball will not play a role in this embodiment.

Figure 20A:
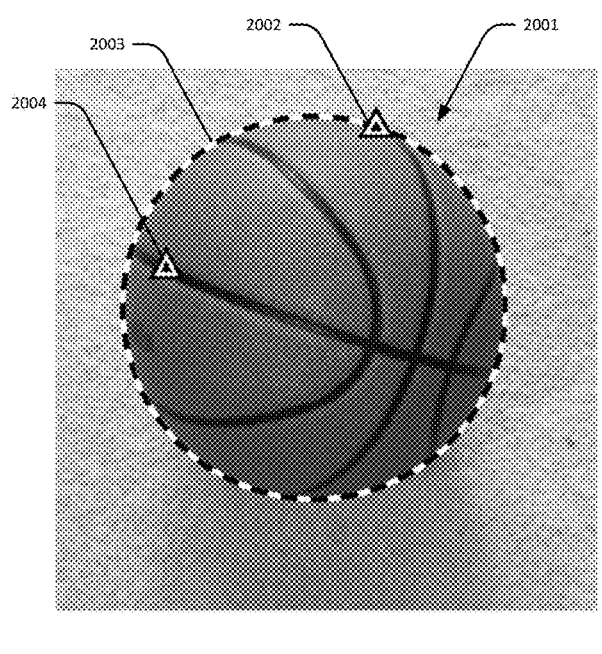
FIGS. 20A-B show exemplar images of a basketball in 2 object orientations with shown features of an embodiment of the disclosed machine vision methodology.
Figure 20B:
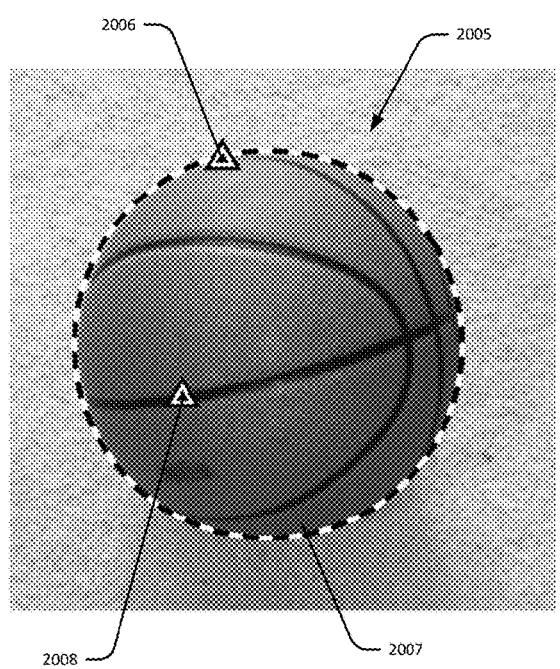

In each image from a series of frames of video of a basketball in motion, the orientation of both visible great circles is measured by the methodology disclosed above, or by a modification of this methodology described below that takes advantage of the known orthogonality. FIGS. 20A and 20B are illustrative of the measurement as performed on two successive video frame images. FIG. 20A pictorially depicts an output of the orientation measurements for each of the two visible great circle markings on the ball 2001 from FIG. 19A. The circle 2003 depicts the measurement of the reference circle on the ball by one of the processes disclosed above. The triangle marking 2002 indicates the tip of one great circle orientation vector which originates at the ball's centerpoint and terminates on the surface of the ball. This is an orientation vector for the great circle that does not contain 2002. Similarly the triangle marking 2004 indicates the tip of a great circle orientation vector for the other great circle, namely the circle which does not contain 2004. These two orthogonal great circle orientation vectors are measured by a modification of one of the processes disclosed above. FIG. 20B similarly depicts the output of the orientation measurement for each of the two great circles visible on the ball 2005 from FIG. 19B. The circle 2007 depicts the measurement of the reference circle on the ball. The triangular marking 2006 and 2008 each indicates the tips of a pair of orthogonal great circle orientation vectors.

Figure 21A:
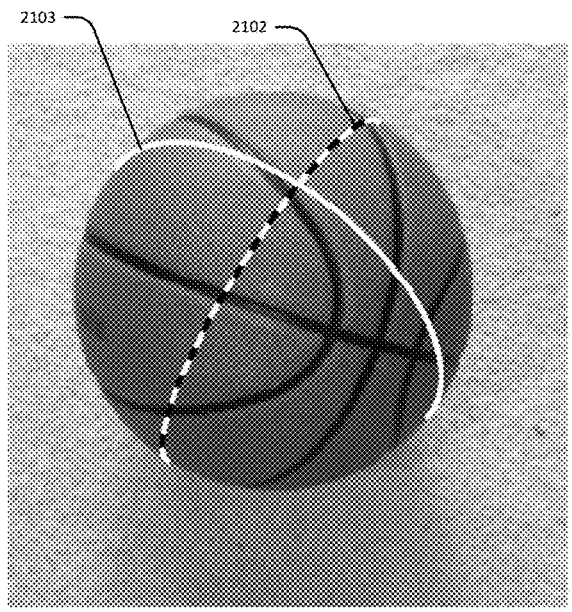
FIGS. 21A-B show exemplar images of a basketball in 2 object orientations with shown features of an embodiment of the disclosed machine vision methodology.
Figure 21B:
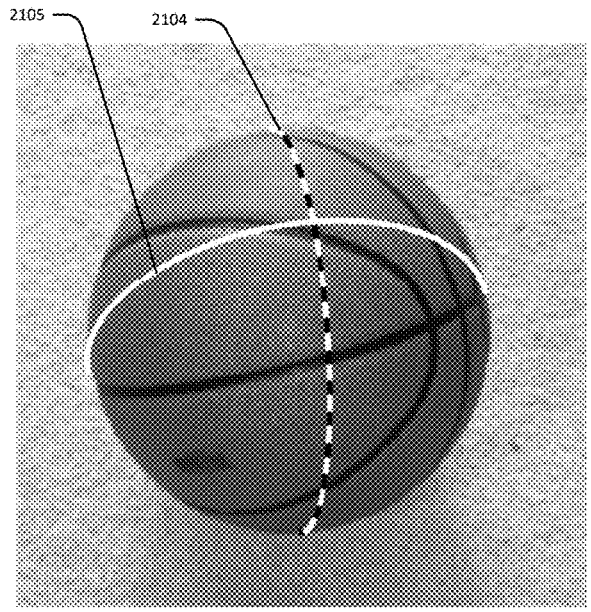

Following a successful implementation of one of the process embodiments on a series of three successive video frame images, the ball rotation between successive images is computed. One element of the output interface is illustrated by the pair of images FIG. 21A and FIG. 21B. FIG. 21A shows the basketball image from FIG. 19A with an overlay depicting a virtual great circle 2102 indicated by dashed marking and an orthogonal virtual great circle 2103 indicated by solid marking. FIG. 21B shows the basketball image from FIG. 19B also with an overlay depicting a virtual great circle 2104 indicated by dashed marking and an orthogonal virtual great circle 2105 indicated by solid marking. The virtual great circles give are a pictorial indicator of the computed rotation that takes the ball from its pose in FIG. 21A to its changed pose in FIG. 21B. The virtual great circles move with the ball during its motion. The changes between frames of the virtual great circles clearly depict the computed ball rotation, while the motion of the visible marked great circles is in general uncorrelated to the ball rotation. Specifically the points of intersection of the virtual great circles 2102 and 2103 in FIG. 21A lie on the ball's rotation axis, as do the points of intersection of the virtual great circles 2104 and 2105 in Figure. For this exemplar image pair basketball rotates 42.7 degrees along the rotation along this axis between the image of FIG. 21A and the image of FIG. 21B. Since the effect of a rotation of 360 degrees about an axis is not discernible, a rotation angle in general is only defined modulo integer multiples of 360 degrees. Note that the virtual great circles shown in FIGS. 21A-B do not in general coincide with the visible great circle markings of the basketball shown in FIGS. 35A-B. The points of intersection of the visible great circle markings in FIGS. 35A-B do not in general lie on the axis of rotation, although the measurements of these visible great circle markings are used in the computation of the virtual great circles as detailed below.

Figures 22A, 22B, 22C:
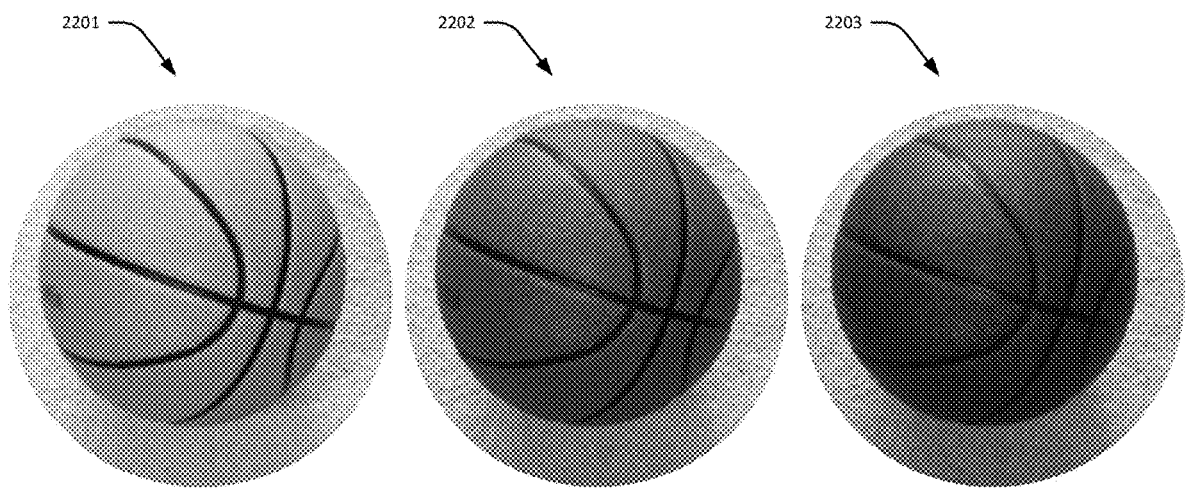
FIGS. 22A-C show exemplar images of a basketball during various stages of color processing of an embodiment of the disclosed machine vision methodology.

FIGS. 22A-C show color preprocessing for a color basketball image. Although the original color image is not shown here, the monochrome of original color image appears as the background image of FIGS. 19A, 20A, 21A and 35A. The original color image shows a standard orange colored basketball with visible black markings on a light beige background. The images shown in FIGS. 22A-C are the RGB (Red-Green-Blue) channels of the original color image, with Red 2201 Green 2202 and Blue 2203 channels shown in the respective figures. In this example the Red channel shows strong color separation between the orange regions of the ball and the black markings on the ball, and medium separation between the orange regions and the background. The Blue channel shows strong color separation between the orange regions of the ball and the background, and medium separation between the orange regions and the black ball markings. The RGB channels are therefore not an ideal choice for color separation on an orange basketball. The separation is significantly improved by an appropriate transformation in LCH (Lightness-Chroma-Hue) color space (or in the closely related Lab or CIELAB color space).

Figure 23A:
FIGS. 23A-C show exemplar images of a basketball during various stages of color processing of an embodiment of the disclosed machine vision methodology.
Figure 23B:
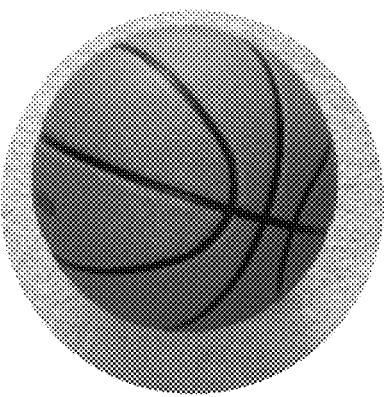
Figure 23C:

In FIGS. 23A-C the original color basketball image is first color transformed and then separated into RGB channels. The color transformation is a rotation in LCH color space by 216 degrees, taking orange hue to blue hue. Following the color transformation the Blue channel in FIG. 23C shows strong separation between the black markings on the ball and the orange regions of the ball, as well as strong separation between the black markings and the background. The Red channel in FIG. 23A shows strong separation between the background and the orange regions of the ball, as well as strong separation between the background and the black markings on the ball. Subtracting the Red channel from the Blue channel yields the differential image in FIG. 24A. In the differential image of FIG. 24A, the orange regions of the ball show good separation from both the black regions of the ball and the background. An additional thresholding results in FIG. 24B and a further inversion results in the final color processed image shown in FIG. 24C. In the final color-processed image the orange regions of the ball are extracted from the original color image.

Figures 24A, 24B, 24C:
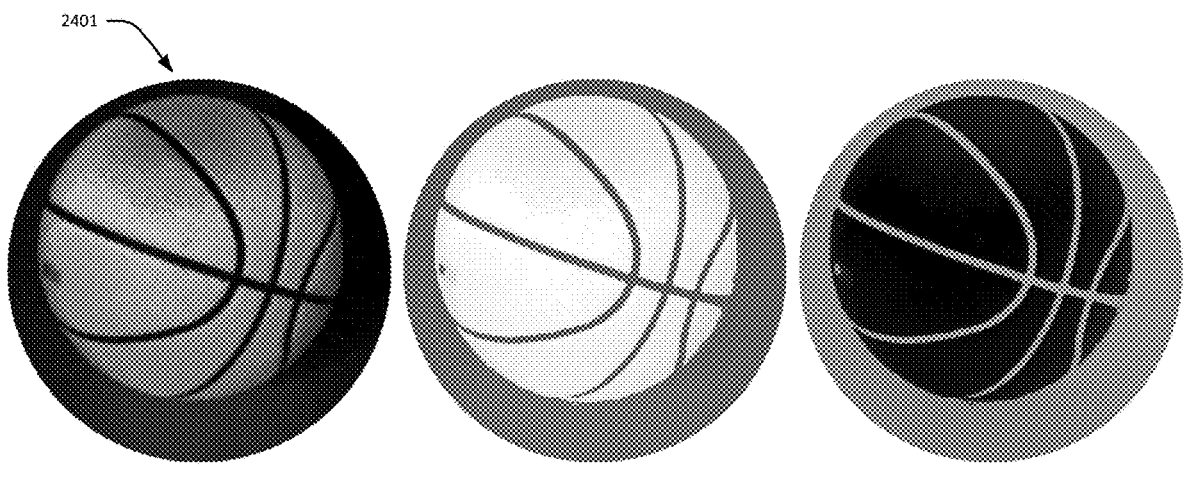
FIGS. 24A-C show exemplar images of a basketball during various stages of color and contrast processing of an embodiment of the disclosed machine vision methodology.

FIGS. 25-34 detail the steps of the great circle measurements performed on the color-processed image in FIG. 24C. A Canny edge detection identifies the edge points that are used as characteristic points in the steps of the great circle measurement process. The process starts with a two-stage circle measurement of the reference circle image. This is followed by a two-stage constrained semiellipse measurement of a visible great circle image. Only one of the two constrained semiellipses is measured at this stage, this semiellipse will be called the primary constrained semiellipse, and the corresponding great circle will be called the primary great circle. The remaining secondary constrained semiellipse is then measured by a second two-stage constrained semiellipse measurement that is optimized to take advantage of the known orthogonality of the two great circles. The corresponding great circle will be called the secondary great circle.

Initial Circle Measurement.

Figure 25A:
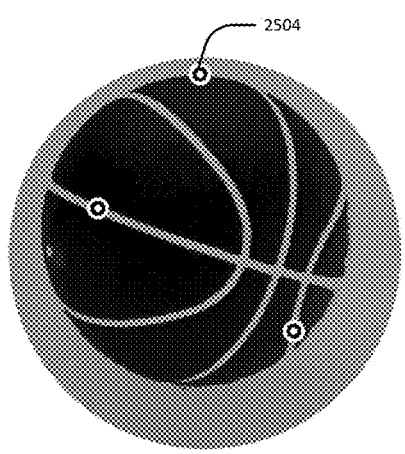
FIGS. 25A-C show cropped images of a basketball during 3 stages of great circle measurement in a disclosed embodiment.
Figure 25B:
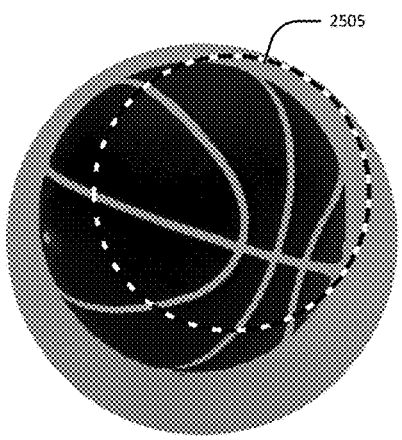
Figure 25C:
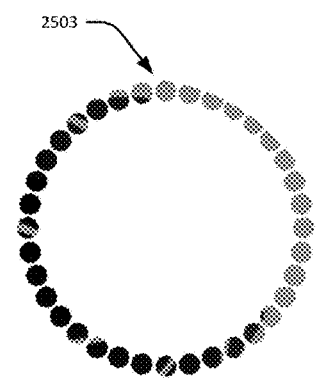
Figure 26A:
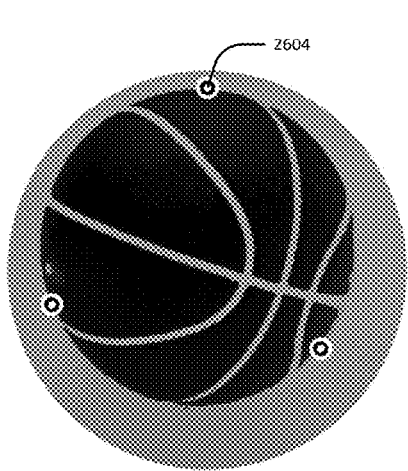
FIGS. 26A-C show cropped images of a basketball during 3 stages of great circle measurement in a disclosed embodiment.
Figure 26B:
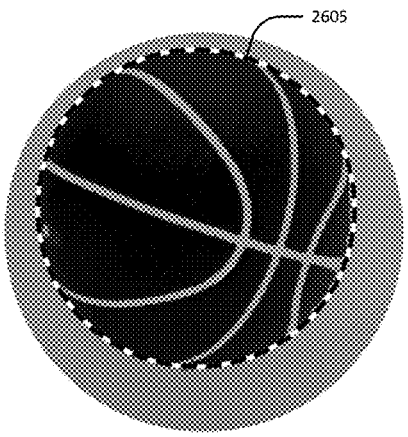
Figure 26C:
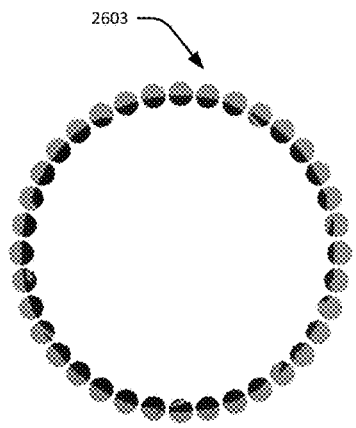

FIGS. 25 and 26 each show an iteration in the initial circle measurement process. In FIG. 25A, an exemplar random sample of 3 characteristic points (edgepoints) is shown, consisting of 2504 and two other indicated points. This sample defines the circle 2505 shown in FIG. 25B. In FIG. 25C the scoring disks 2503 are shown. In this example iteration 11 of 36 disks contain a characteristic point for a score of 11/36, indicating that the circle 2503 in FIG. 25B is not a good fit to the visible circular outline of the basketball image. FIGS. 26A-C show another iteration of the initial circle measurement. In FIG. 26A, another random sample of 3 characteristic points is shown, consisting of 2604 and two other indicated points. This sample defines the circle 2605 shown in FIG. 26B. In FIG. 26C the scoring disks 2603 are shown. In this example iteration all 36 of 36 disks contain a characteristic point for a score of 36/36, indicating that the circle 2503 in FIG. 25B is a good fit to the visible circular outline of the basketball image. The process is iteratively repeated and the result of the initial circle measurement is comprised of the geometric parameters for the best circle found during these iterations.

Final Circle Measurement.

Figure 27A:
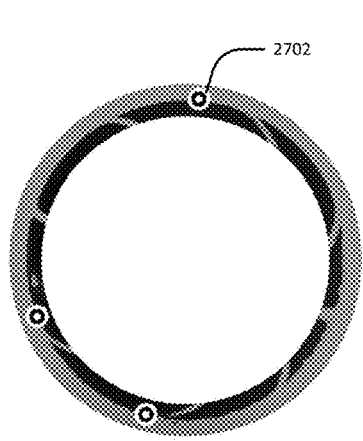
FIGS. 27A-C show cropped images of a basketball during 3 stages of great circle measurement in a disclosed embodiment.
Figure 27B:
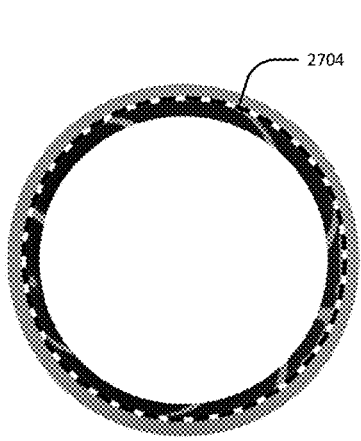
Figure 27C:
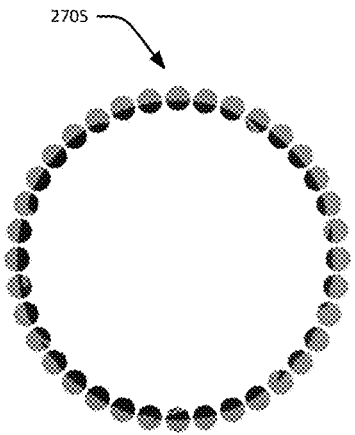

The best circle from the preceding initial circle measurement process is used to crop the image to the set of image points forming an annular ring as shown in FIG. 27A. In FIG. 27A, an exemplar random sample of 3 characteristic points is shown 1502 1503 and 1504. The circle 2704 defined by the characteristic point sample from FIG. 27A is shown in FIG. 27B. The circular scoring disks 27057 are shown in FIG. 27C. The score for FIG. 27C is 36/36, indicating that the circle 2704 is a good fit to the visible circular outline of the basketball image in FIG. 27B. The process is iteratively repeated and the result of the final circle measurement is comprised of the geometric parameters for the best circle found during these iterations.

Initial Primary Constrained Semi-Ellipse Measurement.

Figure 28A:
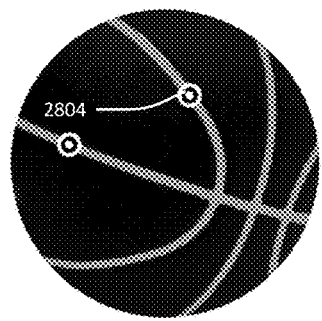
FIGS. 28A-C show cropped images of a basketball during 3 stages of great circle measurement in a disclosed embodiment.
Figure 28B:
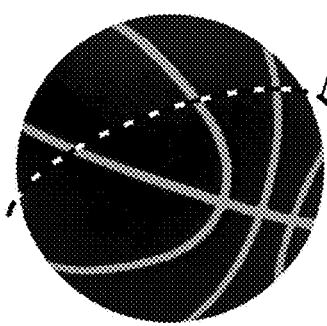
Figure 28C:
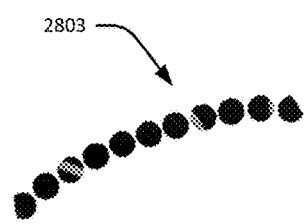
Figure 29A:
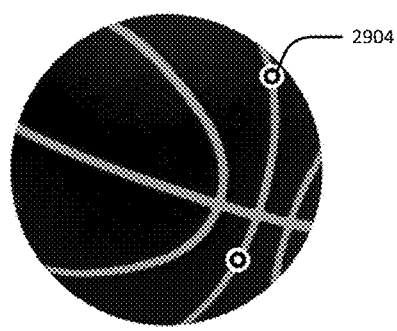
FIGS. 29A-C show cropped images of a basketball during 3 stages of great circle measurement in a disclosed embodiment.
Figure 29B:
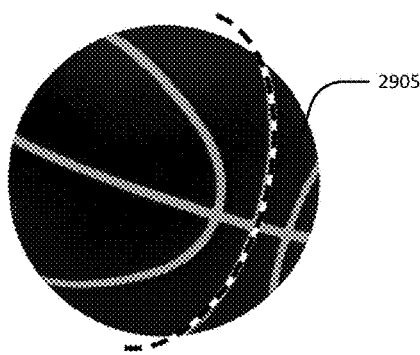
Figure 29C:
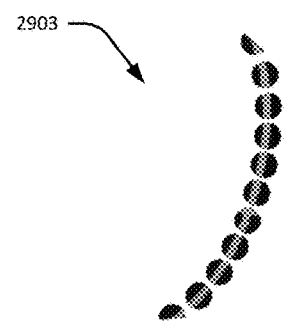
Figure 30A:
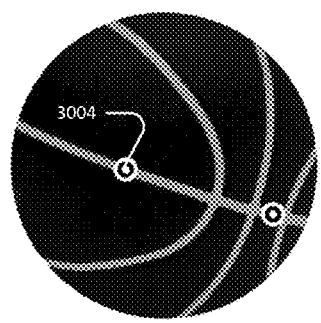
FIGS. 30A-C show cropped images of a basketball during 3 stages of great circle measurement in a disclosed embodiment.
Figure 30B:
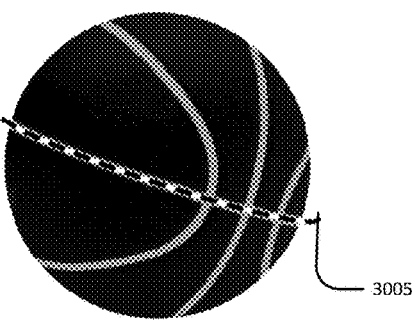
Figure 30C:
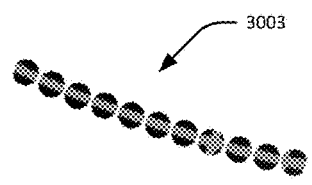

Having accurately and precisely measured the reference circle with the two stages of circle RANSAC, crop the image to a concentric disk slightly smaller than the reference circle as shown in FIG. 28A. The cropped image retains most of the characteristic points of each of the two semiellipses, but eliminates many of the characteristic points that are not on a semiellipse, increasing the probability that a random sample of points is good. In this embodiment, a constrained semiellipse model is used to measure the semi-elliptical images of the two great circles. The constrained semiellipse identified and measured at this stage of the process will be called primary. The process typically identifies the more prominent (in the sense of containing more characteristic points) of the two visible semiellipses as the primary, or identifies one randomly if the two semiellipses are equally prominent. FIGS. 28, 29 and 30 each show an iteration of the first step in the semiellipse measurement process. In FIG. 28A, an exemplar random sample of 2 characteristic points is shown, consisting of 2804 and another indicated point. This sample defines the constrained semiellipse 2805 shown in FIG. 28B. In FIG. 28C the scoring disks 2803 are shown. In this example iteration 3 of 13 (some of the 13 scoring disk are not visible against the white regions of the cropped image) disks contain a characteristic point for a score of 3/13, indicating that the constrained semiellipse 2803 in FIG. 28B is not a good fit to either of the semiellipses visible on the basketball image. In FIG. 29A, another exemplar random sample of 2 characteristic points is shown, consisting of 2904 and another indicated point. This sample defines the constrained semiellipse 2905 shown in FIG. 29B. In FIG. 29C the scoring disks 2903 are shown. In this example iteration 11 of 13 (some of the 13 scoring disk are not visible against the white regions of the cropped image) of disks contain a characteristic point for a score is 11/13, indicating that the constrained semiellipse 2903 in FIG. 29B is a good fit to one of the semiellipses visible on the basketball image. In FIG. 30A, yet another exemplar random sample of 2 characteristic points is shown, consisting of 3004 and another indicated point. This sample defines the constrained semiellipse 3005 shown in FIG. 30B. In FIG. 30C the scoring disks 3003 are shown. In this example iteration 11 of 13 (some of the 13 scoring disk are not visible against the white regions of the cropped image) disks contain a characteristic point for a score of 11/13, indicating that the constrained semiellipse 3005 in FIG. 28B is a good fit the other semiellipse visible on the basketball image. The process is iteratively repeated and the result of the initial primary constrained semiellipse measurement is comprised of the geometric parameters for the best constrained semiellipse found during these iterations. In this example the two visible semiellipses are similarly prominent as reflected by the equal scores for the iterations in FIGS. 29 and 30. For the purposes of this example the primary constrained semiellipse will be 30005 of FIG. 30B the secondary constrained semiellipse will be 2905 of FIG. 29B.

Final Primary Constrained Semi-Ellipse Measurement.

Figures 31A, 31B, 31C:
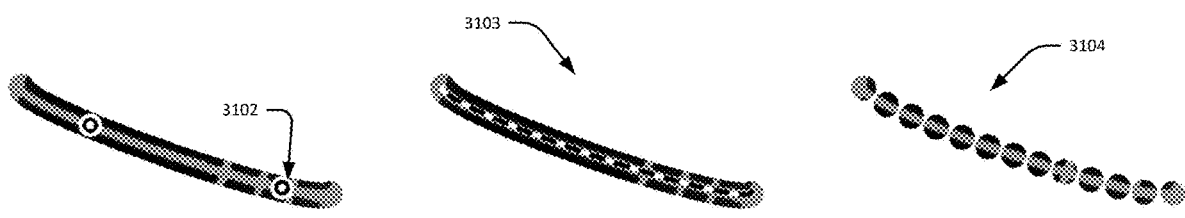
FIGS. 31A-C cropped images of a basketball during 3 stages of great circle measurement in a disclosed embodiment.

The best constrained semiellipse from the preceding initial primary constrained semiellipse measurement process is used to crop the image to the set of nearby image points as shown in FIG. 31A. The cropped image retains most of the characteristic points of the primary constrained semiellipses, but eliminates many of the characteristic points that are not on the primary constrained semiellipse, increasing the probability that a random sample of points is good. FIGS. 31A-C show an iteration used in the final primary constrained semiellipse measurement. The best primary constrained semiellipse from the preceding initial primary constrained semiellipse measurement process is used to crop the image to the set of nearby image points as shown in FIG. 31A. FIG. 31A also shows a sample of 2 randomly selected characteristic points consisting of 3102 and another indicated point. The constrained semiellipse 3103 defined by the characteristic point sample in 31A is shown in FIG. 31B. FIG. 31C shows the scoring disks 3104 corresponding to the constrained semiellipse in FIG. 31B. The score is 13/13 disks containing a characteristic point indicating that the semiellipse 3103 is a good fit to the portion of the semi-elliptical edge visible in FIG. 31B The process is iteratively repeated and the result of the final primary constrained semiellipse measurement is comprised of the geometric parameters for the best constrained semiellipse found during these iterations. A tilt vector for the best primary semiellipse is a great circle orientation vector for the primary great circle marking on the basketball.

Initial Secondary Constrained Semi-Ellipse Measurement.

Figure 32A:
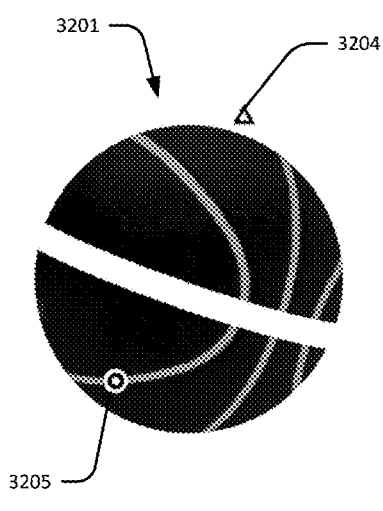
FIGS. 32A-C show cropped images of a basketball during 3 stages of great circle measurement in a disclosed embodiment.
Figure 32B:
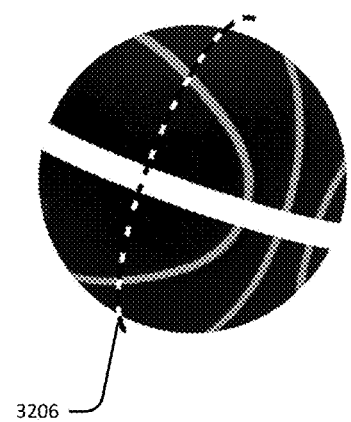
Figure 32C:
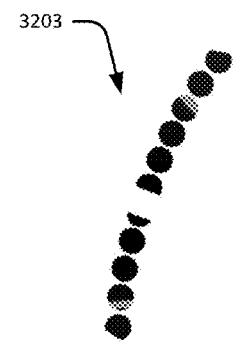
Figure 33A:
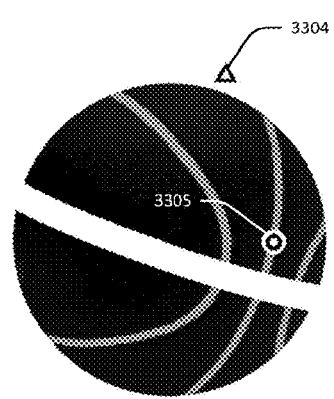
FIGS. 33A-C show cropped images of a basketball during 3 stages of great circle measurement in a disclosed embodiment.
Figure 33B:
Figure 33C:
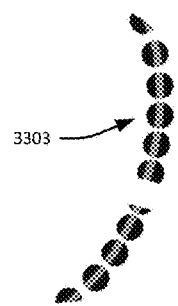

Having accurately and precisely measured the reference circle and primary constrained semiellipse, further crop the image of points inside the reference circle to exclude a strip of points near the primary constrained semiellipse. The orientation of the primary great circle has already been measured, and can be represented by a choice of orientation vector that originates at the center of the ball and has its tip on the upper hemisphere of the ball. The tip of this orientation vector lies on the secondary great circle because the great circles are orthogonal. FIGS. 32 and 33 each show an iteration of the initial secondary constrained semiellipse measurement process on an image cropped in this manner. FIG. 32A shows the tip 3204 of the appropriately chosen orientation vector together with an exemplar random sample of 1 characteristic point (edgepoint) 3205 on an image where the primary constrained semiellipse has been cropped out. The two points 3204 and 3205 define the constrained semiellipse 3206 shown in FIG. 32B. In FIG. 32C the scoring disks 3203 are shown. In this example iteration 2 of 13 (some of the 13 scoring disk are not visible against the white regions of the cropped image) disks contain a characteristic point for a score of 2/13, indicating that the constrained semiellipse 3206 in FIG. 32B is not a good fit to the secondary semiellipse visible on the basketball image. FIG. 33A also shows the tip 3304 of the appropriately chosen orientation vector together with a different exemplar random sample of 1 characteristic point (edgepoint) 3305 on an image where the primary constrained semiellipse has been cropped out. The two points 3304 and 3305 define the constrained semiellipse 3306 shown in FIG. 32B. In FIG. 33C the scoring disks 3303 are shown. In this example iteration 11 of 13 (some of the 13 scoring disk are not visible against the white regions of the cropped image) disks contain a characteristic point for a score of 11/13, indicating that the constrained semiellipse 3306 in FIG. 33B is a good fit to the secondary semiellipse visible on the basketball image. The process is iteratively repeated and the result of the initial secondary constrained semiellipse measurement is comprised of the geometric parameters for the best constrained semiellipse found during these iterations.

Final Secondary Constrained Semi-Ellipse Measurement.

Figure 34A:
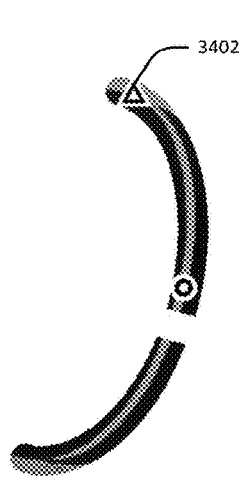
FIGS. 34A-C show cropped images of a basketball during 3 stages of great circle measurement in a disclosed embodiment.
Figure 34B:
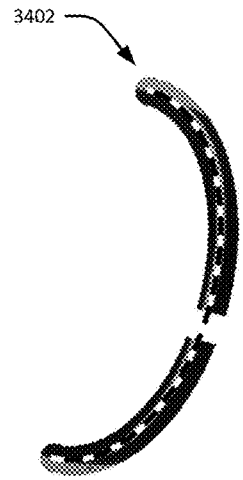
Figure 34C:
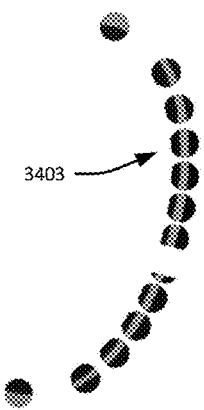

The best constrained secondary semiellipse from the preceding initial secondary constrained semiellipse measurement process is used to crop the image to the set of nearby image points. The best constrained primary semiellipse from the preceding final primary constrained semiellipse measurement process and the best constrained is used to further crop the image to exclude the set of nearby image points FIG. 34 shows an iteration of the final secondary constrained semiellipse measurement process on an image cropped in this manner. FIG. 34A shows the tip 3402 of the appropriately chosen orientation vector together with an exemplar random sample of 1 indicated characteristic point. The two indicated points define the constrained semiellipse 3402 shown in FIG. 34B. In FIG. 34C the scoring disks 3403 are shown. In this example iteration 13 of 13 disks contain an characteristic point for a score of 13/13, indicating that the constrained semiellipse 3406 in FIG. 34B is a good fit to the secondary semiellipse visible on the basketball image. The process is iteratively repeated and the result of the final secondary constrained semiellipse measurement is comprised of the geometric parameters for the best constrained semiellipse found during these iterations. A tilt vector for the best secondary semiellipse is great circle orientation vector for the secondary great circle marking on the basketball.

For illustration purposes, in FIG. 35A the final primary and secondary great circles found by this embodiment are identified by dashed lines 3501. FIG. 35B the primary and secondary great circles 3502 on another image of basketball with different pose. The embodiment described above for measuring the secondary constrained semiellipse ensures that the orientation vector of the secondary great circle is exactly orthogonal, not just approximately orthogonal, to the previously measured orientation vector of the primary great circle. Furthermore, this embodiment is computationally efficient because it requires random samples of only 1 characteristic point.

Measurement of the orthogonal pair of great circle orientations on a single basketball image does not completely determine the orientation of the physical basketball. This is because the pair of great circles appears unchanged under certain rotations of the physical basketball. The effect of a rotation on a point $x=(x_1, x_2, x_3)$ in 3-dimensional space is described by a rotation matrix G, which is a 3 by 3 orthogonal matrix with determinant 1. Measurement of the pair of great circle orientations on a single basketball image can be described by a set of 8 rotation matrices as described below. Measure a great circle orientation vector for the primary great circle by the process described above, and multiply the vector by the reciprocal of its length to obtain the great circle orientation vector $u=(u_1, u_2, u_3)$ of length one. Measure a great circle orientation vector for the secondary great circle by the process described above, and multiply the vector by the reciprocal of its length to obtain the great circle orientation vector $v=(v_1, v_2, v_3)$ of length one. Denote by $w=u \times v$ the cross-product, with components given by $$w_1=u_2v_3-u_3v_2,\ w_2=u_3v_1-u_1v_3,\ w_3=u_1v_2-u_2v_1.$$

This orientation parameters from the measured pair of great circle orientation vectors can then be packaged in the rotation matrix $$G = \begin{bmatrix} u_1 & v_1 & w_1 \\ u_2 & v_2 & w_2 \\ u_3 & v_3 & w_3 \end{bmatrix}$$

which rotates the standard basis vectors i, j, k to the vectors u, v, w respectively. But the rotation matrix G is not completely determined by great circle orientation measurements, because either of the two great circle orientation vectors u, v may be multiplied by −1, and the two vectors may be interchanged. Each of the 8 combinations of these operations correspond to a rotation of the ball that does not change the appearance of the great circles in the image. These 8 rotations are described by the set of 8 matrices $$\{B_1, B_2, B_3, B_4, B_5, B_6, B_7, B_8\}$$

where for each i=1, 2, ..., 8 the matrix $B_i = GA_iG^{-1}$ with $$A_1 = \begin{bmatrix} 1 & 0 & 0 \\ 0 & 1 & 0 \\ 0 & 0 & 1 \end{bmatrix},$$

$$A_2 = \begin{bmatrix} 0 & 1 & 0 \\ -1 & 0 & 0 \\ 0 & 0 & 1 \end{bmatrix},$$

$$A_3 = \begin{bmatrix} -1 & 0 & 0 \\ 0 & -1 & 0 \\ 0 & 0 & 1 \end{bmatrix},$$

$$A_4 = \begin{bmatrix} 0 & -1 & 0 \\ 1 & 0 & 0 \\ 0 & 0 & 1 \end{bmatrix},$$

$$A_5 = \begin{bmatrix} 1 & 0 & 0 \\ 0 & -1 & 0 \\ 0 & 0 & -1 \end{bmatrix},$$

$$A_6 = \begin{bmatrix} 0 & 1 & 0 \\ 1 & 0 & 0 \\ 0 & 0 & -1 \end{bmatrix},$$

$$A_7 = \begin{bmatrix} -1 & 0 & 0 \\ 0 & 1 & 0 \\ 0 & 0 & -1 \end{bmatrix},$$

$$A_8 = \begin{bmatrix} 0 & -1 & 0 \\ -1 & 0 & 0 \\ 0 & 0 & -1 \end{bmatrix}.$$

The information contained in a measurement of the pair of great circle orientations on a single basketball image is then described by the set of rotation matrices $$\{B_1G, B_2G, B_3G, B_4G, B_5G, B_6G, B_7G, B_8G\}.$$

For comparison with terminology of group theory, we note here that the set of matrices $A_i$ indexed by i=1, 2, ..., 8 is the standard point group realization of the dihedral group $D_4$, the symmetry group of a square. This group may be described in terms of generators and relations as follows.

$A_1 = I$, $A_2 = R$, $A_3 = R^2$, $A_4 = R^3$, $A_5 = S$, $A_6 = SR$, $A_7 = SR^2$, $A_8 = SR^3$ where the matrices $$R = \begin{bmatrix} 0 & 1 & 0 \\ -1 & 0 & 0 \\ 0 & 0 & 1 \end{bmatrix},$$

$$S = \begin{bmatrix} 1 & 0 & 0 \\ 0 & -1 & 0 \\ 0 & 0 & -1 \end{bmatrix},$$

$$I = \begin{bmatrix} 1 & 0 & 0 \\ 0 & 1 & 0 \\ 0 & 0 & 1 \end{bmatrix}$$

satisfy the relations $R^4 = I$, $S^2 = I$, $SRS = R^{-1}$. The set of matrices $B_i$ indexed by i=1, 2, ..., 8 is then a conjugate subgroup in the rotation group.

Consider a series of 3 successive image frames from a video of freely moving basketball. The elapsed time between successive images is assumed to be the same. By conservation of angular momentum, the basketball undergoes the same rotation M between the first and second frame as it does between the second and third frame. Describe a measurement of the great circle pair on the first image by the rotation matrix F. Describe a measurement of the great circle pair on the consecutive second image by the rotation matrix G. The matrix $GF^{-1}$ rotates the great circle pair of the first image to the great circle pair of the second image. But this rotation may have been followed by an undetected rotation that left the appearance of the great circles on the second image unchanged. Therefore the actual rotation M of the basketball is only known to be one of the 8 candidate rotation matrices in the set $X = \{B_1GF^{-1}, B_2GF^{-1}, B_3GF^{-1}, B_4GF^{-1}, B_5GF^{-1}, B_6GF^{-1}, B_7GF^{-1}, B_8GF^{-1}\}$, which may alternately be described as $X = \{B_1M, B_2M, B_3M, B_4M, B_5M, B_6M, B_7M, B_8M\}$.

Next describe a measurement of the great circle pair on the consecutive third image by the rotation matrix H. The matrix $HG^{-1}$ rotates the great circle pair of the second image to the great circle pair of the third image. But this rotation may have been preceded by an undetected rotation that left the appearance of the great circles on the second image unchanged. Therefore the actual rotation M of the basketball is only known to be one of the 8 candidate rotation matrices in the set $Y = \{HG^{-1}B_1, HG^{-1}B_2, HG^{-1}B_3, HG^{-1}B_4, HG^{-1}B_5, HG^{-1}B_6, HG^{-1}B_7, HG^{-1}B_8\}$, which may alternately be described as $Y = \{MB_1, MB_2, MB_3, MB_4, MB_5, MB_6, MB_7, MB_8\}$.

Since the actual rotation M of the basketball is in both of these sets, it is in the intersection $$Z = X \cap Y.$$

The set Z contains least one rotation matrix because it contains the actual rotation M. The set Z contains at most 8 rotation matrices because X and Y each contain 8. It is significant for the application here that the set Z contains only the single matrix M with high probability. This is because axis of the rotation M is unlikely to be aligned with a symmetry axis of the great circle pair, as detailed below in group-theoretic terms. So with high probability the actual rotation matrix M of the basketball can be precisely and accurately measured by this process. The axis of rotation and angle of rotation can be computed from the rotation matrix M by standard methods. For comparison with terminology of group theory, X and Y are respectively right and left cosets of a finite non-normal subgroup of the rotation group, and the intersection $X \cap Y$ contains the matrix M. With respect to the Haar probability measure on the rotation group, the probability that the intersection contains another matrix is zero. Accounting for tolerances required by measurement errors, the probability is nonzero but remains very small.

The measurement of basketball rotation is useful in making correct refereeing decisions based on analysis of instant replay or real time video from a basketball game. Basketball rotation measurements are made as above from two series of video frames, one series of three frames before a disputed player touch and one series of three frames after the touch. The series of images before the touch results in a set Z of rotation matrices, which with high probability contains just the one matrix M describing the rotation of the basketball before the touch. The series of images after the touch results in a set Z' of rotation matrices, which with high probability contains just the one matrix M' describing the rotation of the basketball before the touch. If the rotation matrix M' after the touch is different from the rotation matrix M before the disputed touch, then the referee can definitively conclude that a touch occurred. This method works in general, even in the improbable cases where the basketball rotation was not definitively measured before and/or after the disputed touch. In this the set Z and/or the set Z' contains more than one rotation matrix. If the intersection Z∩Z' is empty, then the referee can definitively conclude that a touch occurred.

In alternate embodiments, the rotation of a spheroid in flight is determined using the disclosed methodology based upon virtual great circles which are derived from existing markings on the spheroid which may not be great circles.

The routines and/or instructions that may be executed by the one or more processing units to implement embodiments of the invention, whether implemented as part of an operating system or a specific application, component, program, object, module, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the embodiments of the invention may be used in conjunction with other machine vision applications for measuring orientation and rotation of spherical or hemispherical objects including objects which may be inherently or deliberately marked with great circles or virtual versions of such markings may be inferred from other inherent features or markings on the object. The invention in its broader aspects is therefore not limited to the specific details, representative methods, and illustrative examples shown and described. Accordingly, departures may be made from such details without departing from the spirit or scope of applicant's general inventive concept.

I claim:

1. A method for generating and displaying an overlay geometric model graphic of a physical object in an image comprising:
    acquiring a first image of the physical object, wherein at least a portion of the physical object is spherical;
    selecting a first region of interest in the first image;
    performing a circular random sample consensus operation on the first region of interest to detect a reference circle;
    cropping the first region of interest to the image portion inside the reference circle;
    performing a first semiellipse random sample consensus operation on the cropped first region of interest to detect a first primary semiellipse;
    computing a first set of orientation parameters of the object from geometric parameters of the first primary semiellipse, wherein the first primary semiellipse indicates at least a portion of a first primary great circle discernible on the physical object;
    generating an overlay geometric model graphic based upon the first set of orientation parameters;
    displaying the overlay geometric model graphic combined with the first image.

2. The method as in claim 1 wherein the first circular random sample consensus operation comprises an initial first circular random sample consensus operation establishing an initial reference circle and a final first circular random sample consensus operation which is performed on the first region of the image cropped to a first annular ring comprising image points near the initial reference circle wherein the final first circular consensus operation establishes the reference circle.

3. The method as in claim 1 wherein the first semiellipse random sample consensus operation comprises an initial first semiellipse random sample consensus operation establishing an initial first semiellipse and a final first semiellipse random sample consensus operation which is performed on a region of the image cropped to a semiellipse region comprising image points near the initial first semiellipse wherein the final first semiellipse consensus establishes the first semiellipse.

4. The method as in claim 1 wherein the first semiellipse random sample consensus operation is constrained by the reference circle, wherein the resulting first constrained semiellipse random sample consensus operation is performed by selecting no more than 2 random edge points.

5. The method as in claim 1 wherein the image is an x-ray.

6. The method as in claim 1 wherein the physical object is hemispherical, and wherein the first primary great circle discernible on the object is an edge of the hemispherical object.

7. The method as in claim 1 wherein the physical object is hemispherical and wherein the set of measured orientation parameters comprise at least version and inclination angles.

8. The method as in claim 1 wherein the physical object is an acetabular component of an artificial hip joint.

9. The method as in claim 1 wherein the physical object is a basketball.

10. The method as in claim 1 further comprising:
    performing a second semiellipse random sample consensus operation on the cropped first region of interest which has been further cropped to remove image points near the detected first primary semiellipse to detect a first secondary semiellipse;
    computing a second set of orientation parameters of the physical object from geometric parameters of the first secondary semiellipse;
    generating a second overlay geometric model graphic based upon the second set of orientation parameters;
    displaying the second overlay geometric model graphic combined with the first image.

11. The method as in claim 1 further comprising:
    performing a second semiellipse random sample consensus operation on the cropped first region of interest to detect a first secondary semiellipse, wherein at least one measured orientation parameter of the first primary great circle discernible on the object and associated with the first primary semiellipse is utilized to constrain the second semiellipse random sample consensus operation, wherein with prior knowledge that a first secondary great circle is orthogonal to the first primary great circle, the constrained second semiellipse random sample consensus operation utilizes no more than a single randomly selected edge point
    computing a second set of orientation parameters of the object from geometric parameters of the first secondary semiellipse;
    generating a second overlay geometric model graphic based upon the second set of orientation parameters;
    displaying the second overlay geometric model graphic combined with the first image.

12. The method as in claim 11 further comprising:
    acquiring at least one image after the first image forming a first series of images, wherein the images in the first series of images are sequential in time;
    reporting the method of claim 11 on each subsequent acquired image in the first series of images;
    calculating a first set of rotational parameters for the first series of images;
    generating a first set of overlay geometric model graphics based upon the first set of rotational parameters;
    displaying the first set of overlay geometric model graphics combined with the first image.

13. The method as in claim 12 wherein all the performed semiellipse random sample consensus operations are constrained by the respective circles and wherein all of the constrained random sample consensus operations are performed by selecting no more than 2 edge points within the region for each operation performed.

14. A system for generating and displaying an overlay geometric model graphic of a physical object in an image comprising:
    an image acquisition component wherein an image of the object is acquired, wherein at least a portion of the object is spherical;
    a central processing unit configured to execute instructions comprising:
    an image processing selection module configured to select a region of interest in the image,
    an image processing object identification module configured to perform a circular random sample consensus operation on the region of interest to detect a reference circle, to crop the region of interest to the image portion inside the reference circle, to perform a semiellipse random sample consensus operation on the cropped region of interest to detect a semiellipse, wherein the semiellipse indicates at least a portion of a first primary great circle discernible on the object, to compute a first set of orientation parameters of the object from geometric parameters of the semiellipse, wherein the image processing object identification module is configured to generate an overlay geometric model graphic based upon the first set of orientation parameters;

a display unit configured to display the overlay geometric model graphic combined with the first image.

15. The system as in claim 14 wherein the circular random sample consensus operation comprises an initial circular random sample consensus operation establishing an initial reference circle and a final circular random sample consensus operation which is performed on a region of the image cropped to an annular ring comprising image points near the initial reference circle wherein the final circular consensus operation establishes the reference circle.

16. The system as in claim 14 wherein the semiellipse random sample consensus operation comprises an initial semiellipse random sample consensus operation establishing an initial semiellipse and a final semiellipse random sample consensus operation which is performed on a region of the image cropped to images points near the initial semiellipse, wherein the final semiellipse consensus operation establishes the semiellipse.

17. The system as in claim 14 wherein the semiellipse random sample consensus operation is constrained by the circle, wherein the constrained semiellipse random sample consensus operation is performed by selecting no more than 2 edge points within the region.

18. A non-transitory computer readable medium storing a program for generating an overlay geometric model graphic of a physical object in an image, comprising instructions, which when executed on a computer cause the computer to carry out the steps of:

performing a circular random sample consensus operation on a selected first region of interest in an acquired image of the physical object to detect a reference circle;

cropping the first region of interest to the image portion inside the reference circle;

performing a first semiellipse random sample consensus operation on the cropped first region of interest to detect a first primary semiellipse;

computing a first set of orientation parameters of the object from geometric parameters of the first primary semiellipse, wherein the first primary semiellipse indicates at least a portion of a first primary great circle discernible on the physical object;

generating an overlay geometric model graphic based upon the first set of orientation parameters, configured for display in combination with the first image.

19. The non-transitory computer readable medium as in claim 18 wherein the first circular random sample consensus operation comprises an initial first circular random sample consensus operation establishing an initial reference circle and a final first circular random sample consensus operation which is performed on the first region of the image cropped to a first annular ring comprising image points near the initial reference circle wherein the final first circular consensus operation establishes the reference circle.

20. The non-transitory computer readable medium as in claim 18 wherein the first semiellipse random sample consensus operation is constrained by the reference circle, wherein the resulting first constrained semiellipse random sample consensus operation is performed by selecting no more than 2 random edge points.

21. The non-transitory computer readable medium as in claim 18 wherein the overlay geometric model graphic is combined with the image for display.

* * * * *